(12) United States Patent
Bohler et al.

(10) Patent No.: US 7,702,203 B1
(45) Date of Patent: Apr. 20, 2010

(54) ARMORED FIBER OPTIC ASSEMBLIES AND METHODS OF MAKING THE SAME

(75) Inventors: Gregory B. Bohler, Lenoir, NC (US); Julian L. Greenwood, III, Hickory, NC (US); Keith A. Greer, Morgantown, NC (US); Allen M. Miller, Lenoir, NC (US); Wesley B. Nicholson, Hickory, NC (US); Kimberly D. Slan, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 12/261,645

(22) Filed: Oct. 30, 2008

(51) Int. Cl.
*G02B 6/44* (2006.01)

(52) U.S. Cl. ...................................................... 385/107

(58) Field of Classification Search .......... 385/100–114
See application file for complete search history.

(56) References Cited

U.S. PATENT DOCUMENTS

| | | | | |
|---|---|---|---|---|
| 5,305,411 | A * | 4/1994 | Arroyo | 385/109 |
| 5,615,293 | A * | 3/1997 | Sayegh | 385/102 |
| 5,920,671 | A * | 7/1999 | Smith | 385/102 |
| 6,233,384 | B1 | 5/2001 | Sowell, III et al. | 385/107 |
| 6,898,354 | B2 | 5/2005 | Kim et al. | 385/100 |
| 7,025,509 | B2 | 4/2006 | Martin | 385/86 |
| 7,064,276 | B2 | 6/2006 | Sakabe et al. | 174/110 R |
| 7,196,272 | B2 | 3/2007 | Glew | 174/113 C |
| 7,202,418 | B2 | 4/2007 | Glew | 174/113 C |
| 7,313,304 | B2 * | 12/2007 | Andrews et al. | 385/107 |
| 2003/0202756 | A1 * | 10/2003 | Hurley et al. | 385/101 |
| 2005/0196113 | A1 | 9/2005 | Hurley et al. | 385/109 |
| 2008/0253723 | A1 * | 10/2008 | Stokes et al. | 385/114 |
| 2009/0139084 | A1 * | 6/2009 | Franklin et al. | 29/825 |

* cited by examiner

*Primary Examiner*—Daniel Petkovsek
(74) *Attorney, Agent, or Firm*—C. Keith Montgomery

(57) ABSTRACT

Armored fiber optic assemblies are disclosed that include a dielectric armor along with methods for manufacturing the same. The dielectric armor has an armor profile, thereby resembling conventional metal armored cable to the craft. The dielectric armor provides additional crush and impact resistance and the like for the optical fibers and/or fiber optic assembly therein. The dielectric armor is advantageous to the craft since it provides the desired mechanical performance without requiring the time and expense of grounding like conventional metal armored cables. Additionally, the armored fiber optic assemblies can have any suitable flame and/or smoke rating for meeting the requirements of the intended space.

31 Claims, 17 Drawing Sheets

TABLE 1

| PARAMETER/STRAIN LIMIT | 80% MIN | 40% MIN | | | | 80% MIN | 40% MIN | | | | 80% MIN | 40% MIN | | | | |
|---|---|---|---|---|---|---|---|---|---|---|---|---|---|---|---|---|
| T1, mm | 2.61 | 2.66 | 2.70 | 2.83 | 3.00 | 2.63 | 2.68 | 2.75 | 2.90 | 3.22 | 2.65 | 2.75 | 2.75 | 2.85 | 3.01 | 3.44 |
| T2, mm | 2.40 | 2.16 | 2.20 | 2.33 | 2.50 | 2.16 | 1.93 | 2.00 | 2.15 | 2.47 | 1.93 | 1.75 | 1.75 | 1.85 | 2.01 | 2.01 |
| GROOVE LENGTH, 2(L2), mm | 0.20 | 0.60 | 2.00 | 4.00 | 7.00 | 0.20 | 0.60 | 2.00 | 4.00 | 7.00 | 0.60 | 1.30 | 1.30 | 2.50 | 4.00 | 7.00 |
| GROOVE DEPTH, do+di, mm | 0.50 | 0.50 | 0.50 | 0.50 | 0.50 | 0.75 | 0.75 | 0.75 | 0.75 | 0.75 | 1.00 | 1.00 | 1.00 | 1.00 | 1.00 | 1.00 |
| GROOVE LENGTH/PITCH, 2 L2/P | 0.02 | 0.06 | 0.20 | 0.40 | 0.70 | 0.02 | 0.06 | 0.20 | 0.40 | 0.70 | 0.06 | 0.13 | 0.13 | 0.25 | 0.40 | 0.70 |

FIG. 8A

TABLE 2

| PARAMETER/STRAIN LIMIT | 40% MIN | | | | | | | | | | | | | |
|---|---|---|---|---|---|---|---|---|---|---|---|---|---|---|
| T1, mm | 1.73 | 1.74 | 1.74 | 1.52 | 1.70 | 1.86 | 1.88 | 1.90 | 1.93 | 1.99 | 1.98 | 2.02 | 2.05 | 2.10 |
| T2, mm | 1.23 | 1.24 | 1.24 | 1.02 | 1.20 | 1.11 | 0.98 | 1.15 | 1.18 | 1.24 | 0.98 | 1.23 | 1.05 | 1.10 |
| GROOVE LENGTH, 2(L2), mm | 5.20 | 6.00 | 7.75 | 4.00 | 8.00 | 6.00 | 6.60 | 7.00 | 7.75 | 8.00 | 6.20 | 6.60 | 7.00 | 7.75 |
| GROOVE DEPTH, do+di, mm | 0.50 | 0.50 | 0.50 | 0.50 | 0.50 | 0.75 | 0.75 | 0.75 | 0.75 | 0.75 | 1.00 | 1.00 | 1.00 | 1.00 |
| GROOVE LENGTH/PITCH, 2L2/P | 0.52 | 0.60 | 0.78 | 0.40 | 0.80 | 0.60 | 0.66 | 0.70 | 0.78 | 0.80 | 0.62 | 0.66 | 0.70 | 0.78 |

FIG. 8B

TABLE 3

| PARAMETER/STRAIN LIMIT | 80% MIN | | | | | | | | | | | | | |
|---|---|---|---|---|---|---|---|---|---|---|---|---|---|---|
| T1, mm | 1.38 | 1.41 | 1.46 | 1.52 | 1.70 | 1.42 | 1.45 | 1.51 | 1.61 | 1.91 | 1.47 | 1.52 | 1.68 | 2.12 |
| T2, mm | 0.88 | 0.91 | 0.96 | 1.02 | 1.20 | 0.67 | 0.70 | 0.76 | 0.86 | 1.16 | 0.47 | 0.52 | 0.68 | 1.12 |
| GROOVE LENGTH, 2(L2), mm | 0.60 | 1.50 | 2.50 | 4.00 | 8.00 | 0.90 | 1.50 | 2.50 | 4.00 | 8.00 | 1.10 | 1.50 | 4.00 | 8.00 |
| GROOVE DEPTH, do+di, mm | 0.50 | 0.50 | 0.50 | 0.50 | 0.50 | 0.75 | 0.75 | 0.75 | 0.75 | 0.75 | 1.00 | 1.00 | 1.00 | 1.00 |
| GROOVE LENGTH/PITCH, 2L2/P | 0.06 | 0.15 | 0.25 | 0.40 | 0.80 | 0.09 | 0.15 | 0.25 | 0.40 | 0.80 | 0.11 | 0.15 | 0.40 | 0.80 |

FIG. 8C

TABLE 4

| PARAMETER/STRAIN LIMIT | 80% MIN | | | | | | | | | |
|---|---|---|---|---|---|---|---|---|---|---|
| t1, mm | 1.45 | 1.53 | 1.54 | 1.57 | 1.57 | 1.70 | 1.73 | 1.77 | 1.89 | 1.97 |
| t2, mm | 0.95 | 1.03 | 1.04 | 1.07 | 1.07 | 0.95 | 0.98 | 1.02 | 0.89 | 0.97 |
| GROOVE LENGTH, 2(L2), mm | 4.40 | 6.00 | 6.20 | 7.00 | 8.00 | 6.60 | 7.00 | 8.00 | 7.00 | 8.00 |
| GROOVE LENGTH, do/di, mmv | 0.50 | 0.50 | 0.50 | 0.50 | 0.50 | 0.75 | 0.75 | 0.75 | 1.00 | 1.00 |
| GROOVE LENGTH/PITCH, 2(L2)/P | 0.44 | 0.60 | 0.62 | 0.70 | 0.80 | 0.66 | 0.70 | 0.80 | 0.70 | 0.80 |

FIG. 8D

TABLE 5

| PARAMETER/STRAIN LIMIT | 110% MIN | | | | | | | | | | |
|---|---|---|---|---|---|---|---|---|---|---|---|
| t1, mm | 1.45 | 1.53 | 1.57 | 1.57 | 1.56 | 1.65 | 1.73 | 1.77 | 1.76 | 1.89 | 1.97 |
| t2, mm | 0.95 | 1.03 | 1.07 | 1.07 | 0.81 | 0.90 | 0.98 | 1.02 | 0.76 | 0.89 | 0.97 |
| GROOVE LENGTH, 2(L2), mm | 4.40 | 6.00 | 7.00 | 8.00 | 5.00 | 6.00 | 7.00 | 8.00 | 6.00 | 7.00 | 8.00 |
| GROOVE LENGTH, do/di, mmv | 0.50 | 0.50 | 0.50 | 0.50 | 0.75 | 0.75 | 0.75 | 0.75 | 1.00 | 1.00 | 1.00 |
| GROOVE LENGTH/PITCH, 2(L2)/P | 0.44 | 0.60 | 0.70 | 0.80 | 0.50 | 0.60 | 0.70 | 0.80 | 0.60 | 0.70 | 0.80 |

FIG. 8E

ARMORED FIBER OPTIC ASSEMBLIES AND METHODS OF MAKING THE SAME

BACKGROUND

1. Field of the Disclosure

The present invention relates generally to optical fiber assemblies, and in particular relates to armored fiber optic assemblies having a dielectric armor along with methods of making the same.

2. Technical Background

Conventional fiber optic cables include optical fibers that conduct light for transmitting voice, video and/or data. The construction of fiber optic cables should preserve optical performance when deployed in the intended environment while also meeting the other additional requirements for the environment. For instance, indoor cables for riser and/or plenum spaces may require certain flame-retardant ratings to meet the demands of the space. In other words, these flame-retardant ratings are addition to mechanical requirements or desired characteristics for the space. Mechanical requirements or characteristics such as crush performance, permissible bend radii, temperature performance, or the like are desired to inhibit undesirable optical attenuation or impaired performance during installation and/or operation within the space. In addition to the mentioned requirements riser and/or plenum spaces may require a ruggedized design for meeting the demands of the space.

By way of example, some indoor applications use a fiber optic cable disposed within an armor layer for providing improved crush performance in riser and/or plenum spaces. For instance, conventional armored constructions have a fiber optic cable disposed within a metallic interlocking armor for creating a robust construction. Specifically, one type of well-known metallic interlocking armor is a "BX armor" or a "Type AC" cable. This metal armor is spiral wound about the fiber optic cable so that the edges of the adjacent wraps of armor mechanically interlock, thereby forming a robust armor layer that also acts as a bend limiting feature for the assembly. However, there are disadvantages for this conventional interlocking armor construction. For instance, fiber optic cables having a metallic armor require additional hardware and/or installation procedures for grounding the metallic armor to meet safety standards, thereby making installation time-consuming and expensive.

FIG. 1 shows several prior art examples of interlocking armored cables 10 having a metallic armor layer 12 (typically aluminum) that serves to protect and preserve optical performance of cables 14 therein. Since metallic armor layer 12 is conductive it must be grounded to comply with the National Electrical Code (NFPA 120) safety standard. This adds to the complexity and expense of installing a metal-armored fiber optic cable. Additionally, the metallic armor can be plastically deformed (i.e., permanently deformed) which can pinch the cable and cause elevated levels of optical attenuation. Nevertheless, the market and craft prefer the design and handling of this rugged cabling.

Manufacturers have attempted to design dielectric armor cables to overcome the drawbacks of the conventional metallic armor constructions, but to date a commercial solution is lacking. For instance, U.S. Pat. No. 7,064,276 discloses a dielectric armor cable having two synthetic resin layers where the hard resin layer has continuous spiral groove cut completely through the hard resin layer along the length of the armor. The hard resin layer is intended for bend control by having adjoining edge portions of the spiral groove abut at the desired minimum bend radius. However, one skilled in the art would recognize this design does not provide the craft with all of the desired features. Moreover, it can be difficult for the craft to recognize the cable of the '276 patent as an armored cable layered because it has a smooth outer surface, whereas conventional metal armored cables are easily identified by the craft as depicted by FIG. 1.

Therefore, there is a need in the art for an armored fiber optic cable with superior mechanical properties that does not require grounding as with metallic interlocking armor, but that also resembles the metallic, interlocking armored cables while providing robust characteristics.

SUMMARY

The disclosure is directed to armored fiber optic assemblies having a dielectric armor along with methods for manufacturing the same. The dielectric armor can have an armor profile, thereby resembling conventional metal armored cable to the craft. Moreover, the dielectric armor provides additional crush and impact resistance to the optical fibers and/or fiber optic assembly therein. The dielectric armor is also advantageous to the craft since it provides the desired mechanical performance without requiring the time and expense of grounding like conventional metal armored cables. Additionally, armored fiber optic assemblies can have any suitable flame and/or smoke rating for meeting the requirements of the intended space; however, the assemblies may have outdoor applications or indoor/outdoor applications.

It is to be understood that both the foregoing general description and the following detailed description present embodiments of the invention, and are intended to provide an overview or framework for understanding the nature and character of the invention as it is claimed. The accompanying drawings are included to provide further understanding of the invention, and are incorporated into and constitute a part of this specification. The drawings illustrate the various example embodiments of the invention and, together with the description, serve to explain the principals and operations of the invention.

BRIEF DESCRIPTION OF THE DRAWINGS

FIG. 8A is a table of design parameters determined by finite-element modeling at two different minimum strain levels for the non-rigid material shown in the true stress vs. true strain graph of FIG. 7;

FIGS. 8B through 8E respectively set forth tables of design parameters determined by finite-element modeling at different minimum strain levels for two different rigid materials shown in the true stress vs. true strain graph of FIG. 7;

DETAILED DESCRIPTION OF THE PREFERRED EMBODIMENTS

Figure 1:
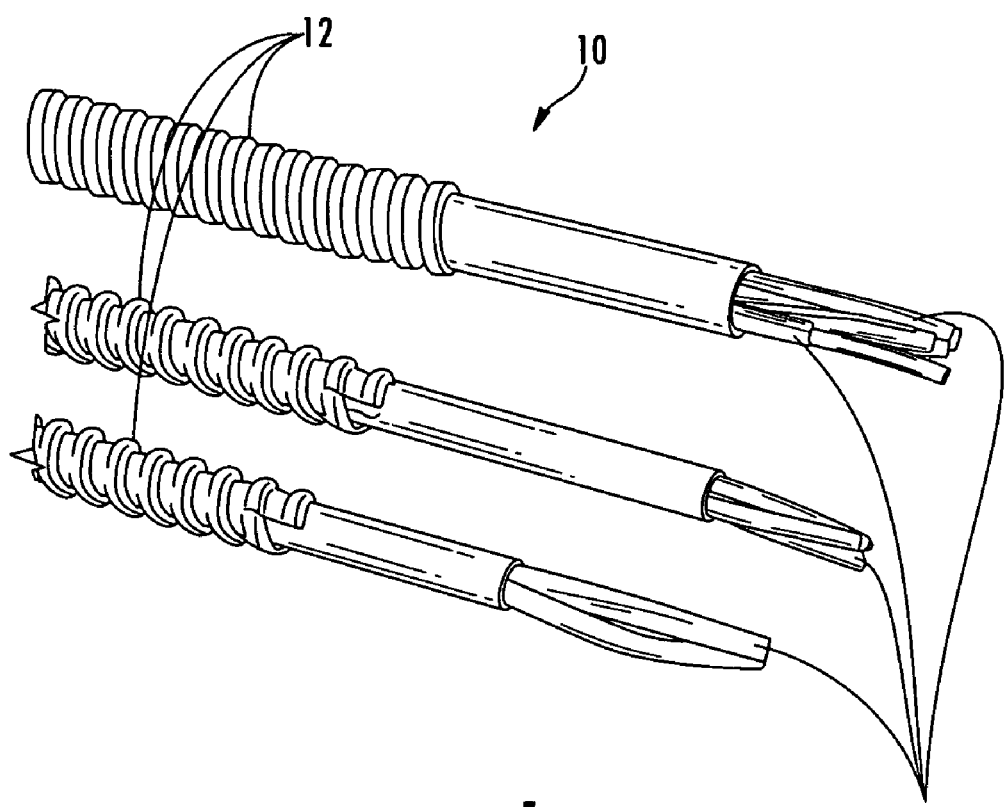
FIG. 1 is a perspective view of three different prior art interlocking armor cables and illustrates the characteristic helical shape of the metal, interlocking armor layer.

Reference is now made in detail to the present preferred embodiments of the invention, examples of which are illustrated in the accompanying drawings. Whenever possible, identical or similar reference numerals are used throughout the drawings to refer to identical or similar parts. It should be understood that the embodiments disclosed herein are merely examples with each one incorporating certain benefits of the present invention. Various modifications and alterations may be made to the following examples within the scope of the present invention, and aspects of the different examples may be mixed in different ways to achieve yet further examples. Accordingly, the true scope of the invention is to be understood from the entirety of the present disclosure in view of, but not limited to the embodiments described herein.

Figure 2A:
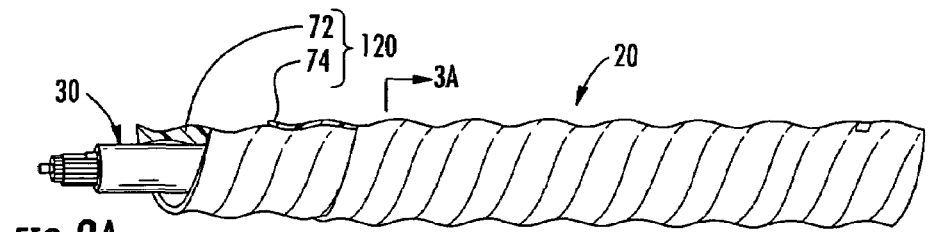
FIG. 2A is a side cut-away view of a first example embodiment of an armored fiber optic assembly having a dielectric armor according to the present invention.
Figure 2B:
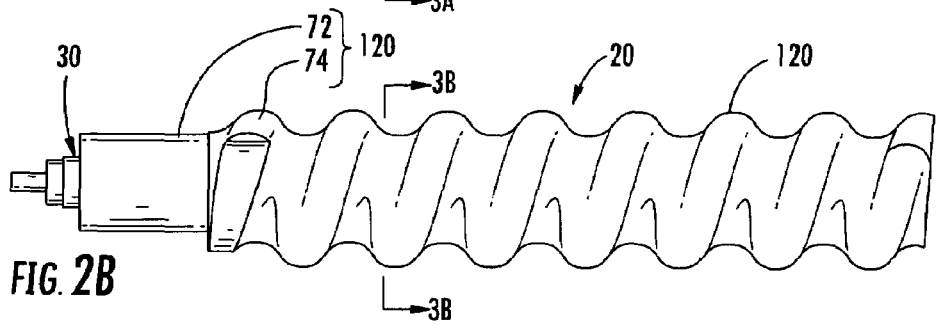
FIG. 2B is a side cut-away view of a second example embodiment of an armored fiber optic assembly having a dielectric armor according to the present invention.

FIGS. 2A and 2B depict side cut-away views of two different armored fiber optic assemblies 20 having at least one optical fiber 40 disposed within a dielectric armor 120. Dielectric armor 120 is non-conductive and has an outer surface (not numbered) that includes an armor profile (not numbered) and in this embodiment is generally formed in a spiral manner along a longitudinal axis. As used herein, armor profile means that the outer surface has an undulating surface along its length that looks similar to the conventional metal armor (i.e., a undulating shape along the length of the armor). Dielectric armor 120 includes one or more layers such as an inner layer 72 and an outer layer 74, but other constructions are possible. For instance, dielectric armor 120 may consist of a single layer such as inner layer 72. Preferably, inner layer 72 is a rigid material and outer layer 74 is a non-rigid material; however, it is possible to use a non-rigid material for inner layer 72 and have the rigid material as outer layer 74. As used herein, "rigid material" means the material has a Shore D hardness of about 65 or greater and "non-rigid material" means the material has a Shore D hardness of about 60 or less. The dielectric armor 120 is advantageous since it provides crush resistance, meets the desired flame or smoke rating, and/or other desirable characteristics, but does not require grounding like conventional metal armor. For instance, armored fiber optic cables can have a diametral deflection of 3.3 millimeters or less during a crush resistance test as discussed below.

FIG. 2A depicts a dielectric armor 120 having multiple layers with the armor profile formed essentially in the inner layer 72 (i.e., the rigid layer) and the outer layer 74 (i.e., the non-rigid material) having an essentially uniform thickness over inner layer 72. Another embodiment of dielectric armor 120 is constructed by eliminating outer layer 74. As shown, a fiber optic assembly 30 is housed within dielectric armor 120. In this embodiment, fiber optic assembly 30 is a fiber optic cable that includes a cable jacket. However, fiber optic assemblies of other embodiments can have other constructions and/or structures such as assemblies that eliminate the cable jacket. By way of example, the fiber optic assembly may be a stranded tube cable, monotube cable, micromodule cable, slotted core cable, loose fibers, tube assemblies, or the like. Additionally, the fiber optic assemblies can include any suitable components such as water-blocking or water-swelling components, flame-retardant components such as tapes, coatings, or other suitable components. Specifically, fiber optic assembly 30 of FIG. 2A includes a central strength member having a plurality of tight-buffered optical fibers stranded thereabout and a cable jacket. Any fiber optic assemblies 30 may have any suitable fiber count such as a 6-fiber MIC cable or 24-fiber MIC cable available from Corning Cable Systems of Hickory, N.C.

FIG. 2B depicts another multi-layer dielectric armor 120 with the armor profile essentially in the outer layer 74 (i.e., the non-rigid material) with inner layer 72 (i.e., the rigid material) having an essentially uniform thickness under outer layer 74. Fiber optic assembly 30 of FIG. 2B includes a plurality of ribbons 56 disposed in a tube 32, thereby forming an assembly. In both embodiments of FIG. 2A and FIG. 2B, inner layer 72 has a "continuous annular cross-section". As used herein, "continuous annular cross-section" means there are not spiral grooves, opening, or slits that cut entirely thru the layer. Additionally, outer layer 74 of the embodiments of FIG. 2A and FIG. 2B are formed from a non-rigid material. Using a non-rigid material as the outer layer is advantageous for several reasons such as providing impact protection for the assembly and/or allowing the selection of a material having a low-smoke characteristic or flame-retardant property.

One skilled in the art will appreciate the extreme difficultly in meeting the desired mechanical characteristics, low-smoke characteristics, and/or flame-retardant characteristics and the like with the armored fiber optic assemblies of the present invention. This difficultly is especially true for the NFPA262 plenum rating. Simply stated, the polymer mass of the armored fiber optic assemblies provides a relatively large combustible mass, thereby making it difficult to meet both mechanical requirements and flame/smoke requirements. Advantageously, certain embodiments of the armored fiber optic assemblies meet both the mechanical and the flame/smoke requirements such as riser-ratings and/or plenum-ratings. Of course, assemblies disclose herein can have outdoor or indoor/outdoor applications.

Figure 3A:
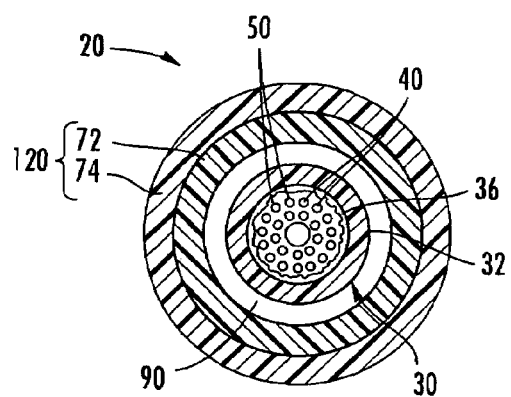
FIG. 3A is a cross-section of the armored fiber optic assembly of FIG. 2A taken along the line 3A-3A.
Figure 3B:
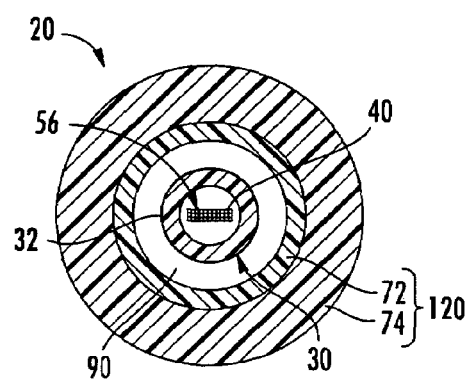
FIG. 3B is a cross-section of the armored fiber optic assembly of FIG. 2B taken along the line 3B-3B.
Figure 3C:
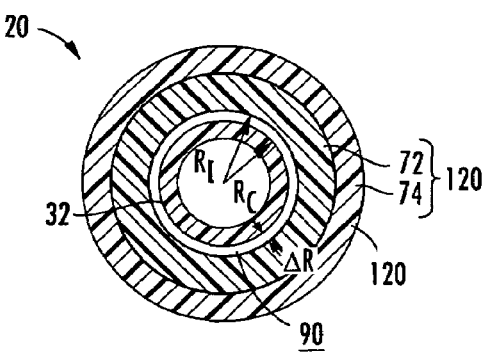
FIG. 3C is a cross-section similar to FIGS. 3A and 3B, but generically depicts a fiber optic assembly disposed within a dielectric armor in order to show a radius $R_C$ of the fiber optic assembly and an inner radius $R_I$ of the dielectric armor.

FIGS. 3A and 3B respectively depict cross-sectional views of armored fiber optic assemblies 20 of FIGS. 2A and 2B taken respectively along the lines 3A-3A and 3B-3B. For the purposes of simplicity in illustration, the dielectric armor 120 is depicted with a uniform cross-section that does not reflect the spiral of the armor profile. As shown, armored assemblies 20 may include a free space 90 disposed between an outer surface of fiber optic assembly 30 and a dielectric armor inner surface. FIG. 3C shows a generic illustration of an armored fiber optic assembly 20 having an outer radius $R_C$ and dielectric armor 120 having an inner radius $R_I$. The amount of free space 90 is characterized by a separation $\Delta R$ between outer surface of fiber optic assembly 30 and the inner surface of dielectric armor 120, wherein $\Delta R = R_I - R_C$. Including free space 90 in the construction aids in preserving optical performance during crush events and the like as discussed below. By way of example, free space 90 is typically about 2 millimeters or less, but free space values larger than 2 millimeters are possible.

If intended for indoor use, embodiments preferably are flame-retardant and have the desired flame-retardant rating depending on the intended space such as plenum-rated, riser-rated, general-purpose, low-smoke zero-halogen (LSZH), or the like. For instance, suitable materials for the layers of dielectric armor 120 may be selected from one or more of the following materials to meet the desired rating: polyvinyl chloride (PVC), polyvinylidene fluoride (PVDF), flame-retardant polyethylene (FRPE), chlorinated polyvinyl chloride (CPVC), polytetra flourethylene (PTFE), polyether-ether keytone (PEEK), Fiber Reinforced Polymer (FRP), low-smoke zero-halogen (LSZH), polybutylene terephthalate (PBT), polycarbonate (PC), polyethylene (PE), polypropylene (PP), polyethylene terephthalate (PETE), and aerylonitaile butadiene styrene (ABS). The skilled artisan understands that many factors of the design can affect flame-ratings and finding a suitable designs and/or materials to meet a given rating can be extremely challenging. One example of an armored fiber optic assembly similar to FIG. 2A having a riser rating includes inner layer 72 formed from a PVC available from Teknor Apex under the tradename 8015 and outer layer 74 is formed from a plenum-grade PVC jacket material available from AlphaGary under the tradename 1070L. Additionally, this PVC/PVC combination results not only in the desired flame-retardant rating, but also meets the desired mechanical robustness. Of course, other suitable material combinations are also possible.

Besides flame- or smoke-ratings, mechanical characteristics of interest include minimum bend radius, impact resistance, crush-resistance, durability of the dielectric armor, susceptibly to plastic deformation, etc. Material characteristics such as the hardness, modulus, etc. along with geometry can influence the desired characteristics/optical performance for the armored fiber optic assemblies. For instance, the inner layer and/or the outer layer should have a suitable modulus of elasticity. By way of example, a modulus of elasticity at 1% strain for the rigid material is about 1200 MPa or greater and the modulus of elasticity at 1% strain for the non-rigid material is between about 300 MPa and about 1200 MPa. Of course, these are merely explanatory examples and other values for the modulus of elasticity are possible with the concepts disclosed herein.

One mechanical property provided by the dielectric armor is its resistance to being crushed (i.e., crush resistance). One test that quantifies crush resistance applies a load of 300 Newtons/centimeter over a 10 centimeter length of the armored fiber optic assembly (i.e., 3000 N total load) for a period of ten minutes at which time a diameteral deflection is measured under load. An optical-performance based crush test is given by the ICEA596 crush standard, which applies a load of 300 Newtons/centimeter for ten minutes and then measures delta attenuation of the optical fibers under load. The ICEA596 crush standard requires a maximum delta attenuation of less than 0.60 dB for multimode (MM) optical fibers at a reference wavelength of 1300 nm and a maximum delta attenuation of 0.40 dB or less for single-mode (SM) optical fibers at a reference wavelength of 1550 nm. Armored fiber optic assemblies 20 were tested according to the ICEA596 crush standard as well as other performance tests as discussed herein. Additionally, assemblies disclosed herein can meet other standards such as GR409 or the like.

Specifically, mechanical testing was conducted on MM optical fiber versions of armored fiber optic assemblies similar to FIG. 2A having 24-fiber MIC cables for fiber optic assembly 30 and other embodiments having a 6-fiber MIC cables. MM versions were tested since they are more sensitive to optical attenuation and a better indicator of optical performance than SM versions. The testing of the MM versions was also conducted at two different reference wavelengths. Additionally, the dielectric armor 120 for the two different structures (24-fiber and 6-fiber) had different geometries as discussed below and shown in detail in FIG. 5B. For instance, the armor profile for the 24-fiber MIC cable embodiments had an average pitch of 10±1 millimeters, an average web thickness of 1±0.2 millimeters, and an average band thickness of 1.6±0.2 millimeters for the inner layer. The armor profile for the 6-fiber MIC cable embodiments had an average pitch of 10±1 millimeters, an average web thickness of 0.8±0.2 millimeters, and an average band thickness of 1.3±0.2 millimeters for the inner layer.

The dielectric armor provided exceptional crush performance. Specifically, Table A lists the results for the two different versions under the ICEA596 crush standard along with similar testing under elevated crush loads of 3500 Newtons and 4000 Newtons. Table A lists the delta optical attenuation results for each crush load with the results at 1300 nanometers listed first and the result at 850 nanometers second.

TABLE A

Crush PerformanceTesting

| Fiber Optic Assembly | 3000 Newtons (1300 nm/ 850 nm) | 3500 Newtons (1300 nm/ 850 nm) | 4000 Newtons (1300 nm/ 850 nm) |
| --- | --- | --- | --- |
| Assembly with 6-Fiber MIC Cable | 0.14 dB/0.12 dB | 0.09 dB/0.08 dB | 0.24 dB/0.16 dB |
| Assembly with 24-Fiber MIC Cable | 0.06 dB/0.05 dB | 0.05 dB/0.05 dB | — |

As shown, the crush performance results for the tested armored fiber optic assemblies were much lower than the under the ICEA596 crush standard. The results for both the MM fiber counts were about 0.20 dB or less at 1300 nm and 3000 Newtons, which is one-third of the pass value for the ICEA596 crush standard, which is 0.60 dB or less. Moreover, the load was increased to 4000 Newtons and the results still were less than half of the pass value at 3000 Newtons. Additionally, the values for SM armored fiber optic assemblies were not tested but should have delta attenuation of about 0.20 dB or less at 1300 nm and 3000 Newtons since they are less sensitive than MM optical fibers.

Figure 4:
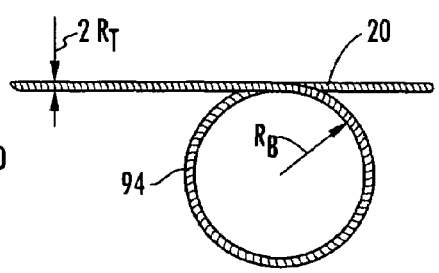
FIG. 4 is a schematic diagram of an example embodiment of an armored fiber optic assembly formed in a bend radius (i.e., a loop)

Another mechanical property of the armored fiber optic assemblies is their flexibility (e.g., the ability to bend without damage and/or causing elevated levels of attenuation). Generally speaking, the maximum amount of bending that armored assemblies can withstand without kinking, cracking, separating and/or causing elevated optical attenuation is characterized by its minimum bend radius. FIG. 4 shows a loop 94 of armored fiber optic assembly 20 formed into a bend radius $R_B$. In other words, the bend radius $R_B$ is the distance from the center to the inner surface of the assembly when formed into a coil as shown by FIG. 4. The bend radius $R_B$ may be related to other dimensions and/or characteristics of the armored fiber optic assembly. For instance, the minimum bend radius $R_B$ may be related to the maximum outer diameter of armored fiber optic assembly (2 times the maximum armored fiber optic assembly radius $R_T$). By way of example, if armored fiber optic assembly 20 has an outer diameter of $2R_T$ then minimum bend radius $R_B$ may be a multiple of the outer diameter of $2R_T$ such as $R_B(min) \geq 10R_T$. Of course, the assembly can have a minimum bend radius that is smaller than provided by the relationship.

Table B lists the delta optical attenuation results for two different bend radii, specifically, at $10R_T$ and $8R_T$ for the armored fiber optic assemblies described above.

TABLE B

Bend Radii Testing

| Fiber Optic Assembly | $10R_T$ Bend Radius (1300 nm/850 nm) | $8R_T$ Bend Radius (1300 nm/850 nm) |
| --- | --- | --- |
| Assembly with 6-Fiber MIC Cable | 0.01 dB/0.01 dB | 0.02 dB/0.01 dB |
| Assembly with 24-Fiber MIC Cable | 0.04 dB/0.05 dB | — |

As shown, the delta optical attenuation performance for the bend radius testing was relatively low for the assembly with the 6-fiber MIC cable and for the assembly with the 24-fiber MIC cable at a bend radius of $20R_T$. Data for the smaller bend radius of $16R_T$ is not given since the values at $20R_T$ were somewhat elevated. Thus, the tested assemblies performed extremely well in the bend radii testing when compared with the ICEA596 standard. Other variations or embodiment can have much higher levels of optical attenuation such as 0.60 dB or less during bending so long as the performance is acceptable.

Table C lists the delta optical attenuation results for impact testing for the armored fiber optic assemblies described above. Impact testing was conducted using two different masses, specifically, 2 kg and 6 kg at reference wavelengths of 1300 nm and 850 nm. Impact testing included two impacts at three separate locations (e.g., about 150 millimeters apart) for each assembly and the maximum delta attenuation for impacts of each assembly is listed in Table C.

TABLE C

Impact Testing

| Fiber Optic Assembly | 2 kg (1300 nm/850 nm) | 6 kg (1300 nm/850 nm) |
| --- | --- | --- |
| Assembly with 6-Fiber MIC Cable | 0.00 dB/0.00 dB | 0.00 dB/0.01 dB |
| Assembly with 24-Fiber MIC Cable | 0.00 dB/0.00 dB | 0.00 dB/0.01 dB |

As shown, the delta optical attenuation performance for the impact testing showed little to no delta optical attenuation for either assembly at either mass. Overall, the tested armored fiber optic assemblies proved comparable with, or better, than conventional metallic armor cable assemblies.

Figure 5A:
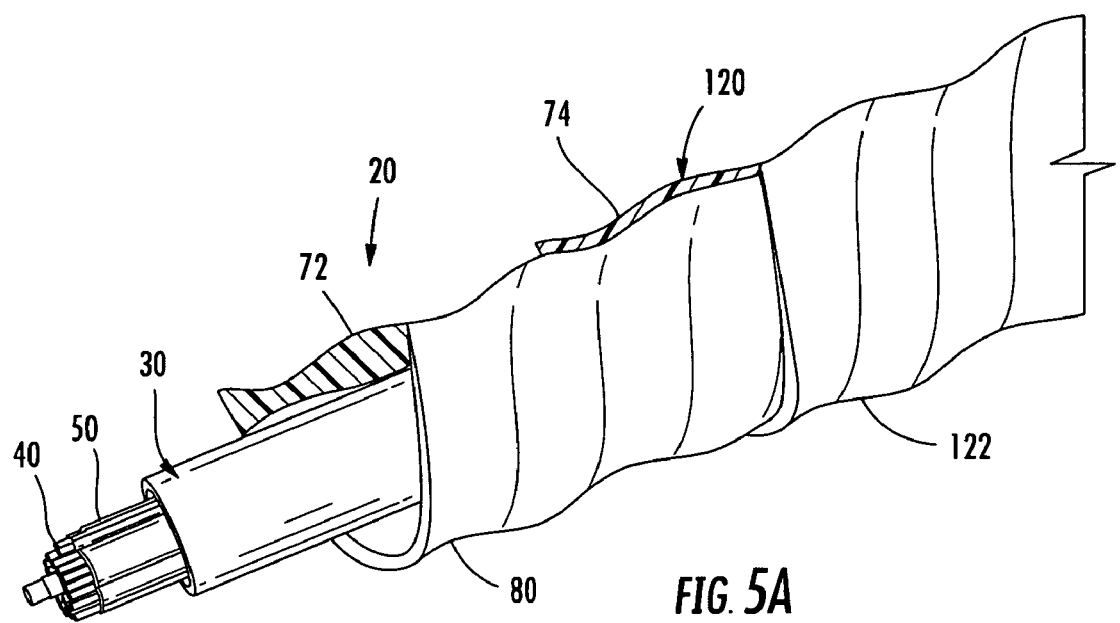
FIG. 5A is an enlarged perspective view and FIG. 5B is a close-up view of the armored fiber optic assembly of FIG. 2A showing a partial longitudinal cross-section of the dielectric armor superimposed on a grid for reference of the shapes of the layers.
Figure 5B:
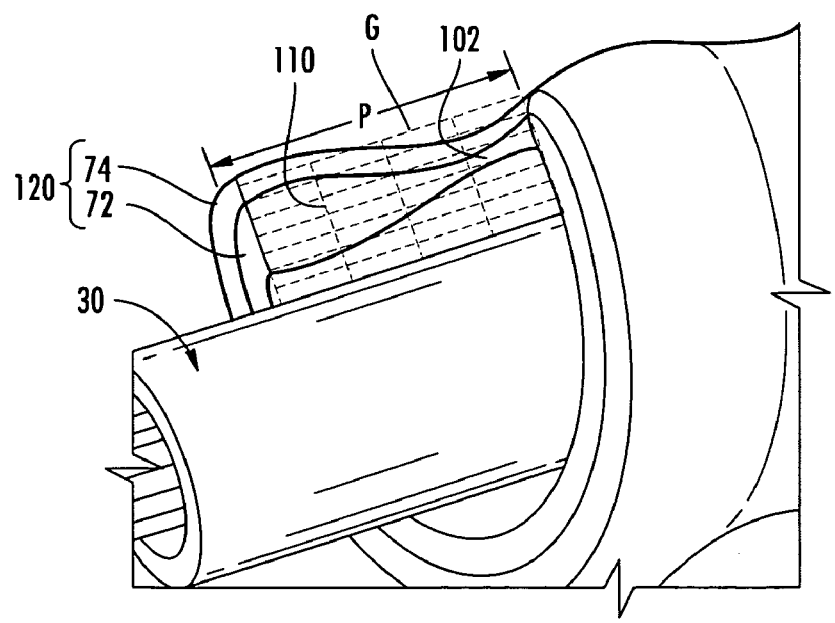

FIG. 5A is an enlarged perspective view and FIG. 5B is a close-up view of the armored fiber optic assembly of FIG. 2A showing a partial longitudinal cross-section of the dielectric armor superimposed on a grid G for referencing the shapes of the layers. Armored profile has a pitch P (i.e., a generally repeating shape that forms the armored profile in a spiral manner along the longitudinal axis) that includes a web 102 and a band 110. The geometry of the armored profile is discussed below in more detail with respect to finite-element modeling performed. As best shown in FIG. 5B, armored profile of this embodiment is generally formed with inner layer 72 having a curvilinear profile formed in a spiral along the longitudinal axis and outer layer 74 has a generally uniform thickness formed over the curvilinear profile of inner layer 72. Two factors that influence the mechanical performance of the dielectric armor are geometry of the armored profile and the material characteristics of the layers.

Figure 6A:
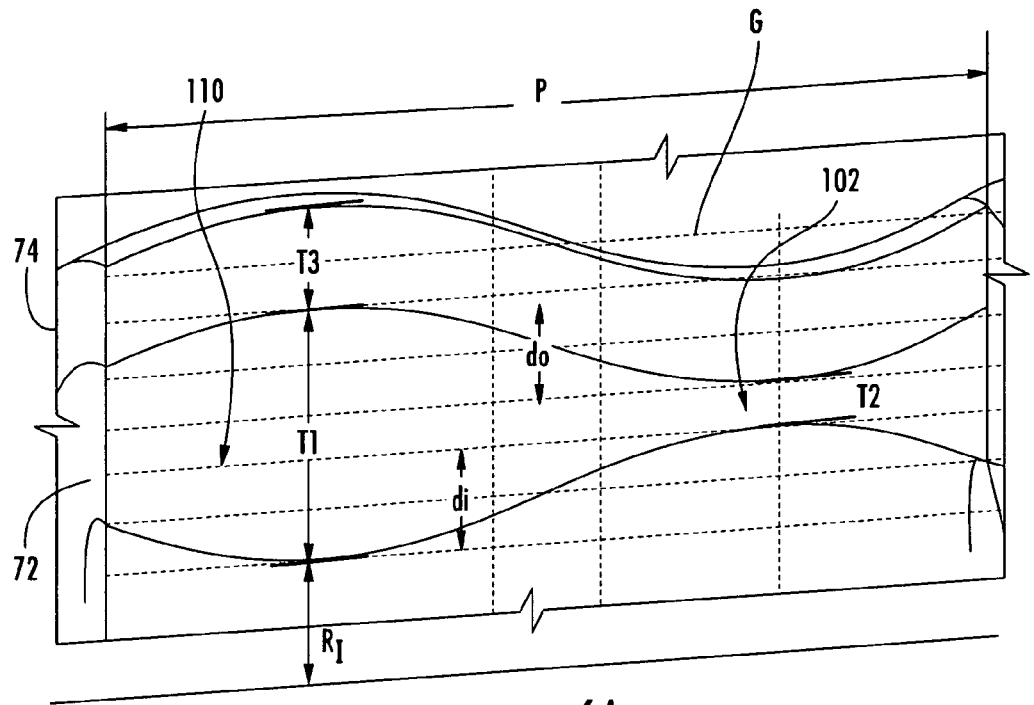
FIG. 6A is an enlarged view of a portion of the dielectric armor of FIG. 5B further showing various dimensions associated therewith.

FIG. 6A depicts an enlarged cross-sectional view of a portion of the dielectric armor of FIG. 5B superimposed on grid G with certain dimensions of the armor profile shown. As shown, the dielectric armor includes web 102 and band 110. Inner layer 72 of band 110 has a thickness T1 and the web 102 of inner layer 72 has a thickness T2 as shown. As shown on grid G, web thickness T2 is defined as $T2=T1-d_O-d_i$, where an outer groove depth $d_O$ is the height difference between the band and the web of inner layer 72, and an inner groove depth $d_i$ is the height difference between the band and the web of inner layer 72. Moreover, a total groove depth $d_O+d_i$ is the sum of the outer groove depth $d_O$ and inner groove depth $d_i$. In this illustration, outer layer 74 has a thickness T3 that is essentially uniform along the length of the armor profile, but the either or both of the layers could have the armor profile. Dielectric armor 120 has an inner radius $R_I$ and an outer radius that is $R_I+T_1$.

Figure 6B:
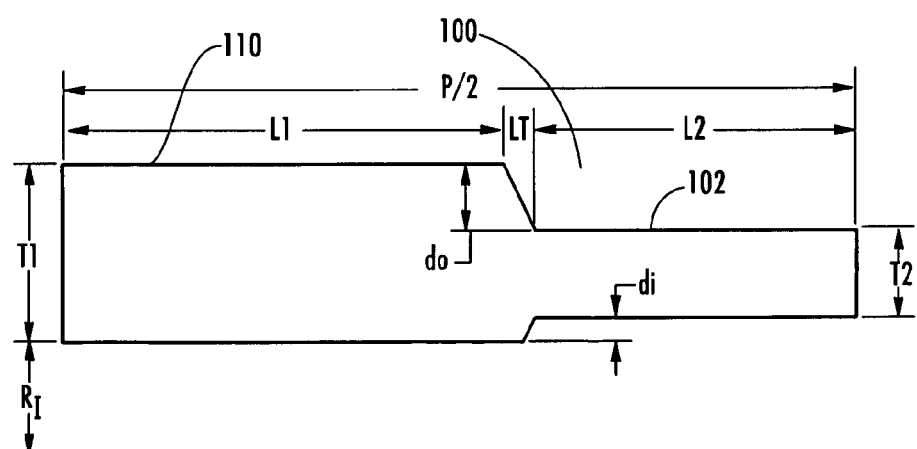
FIG. 6B is an enlarged perspective view of a portion of a generic armored profile showing the geometry of used for finite-element modeling of the dielectric armor.

FIG. 6B is an enlarged perspective view of a portion of the layer of the dielectric armor having the armor profile showing generic geometry/dimensions used for finite-element modeling of the same. FIG. 6B depicts an armor profile that is shaped very closely to a step profile, which provides excellent mechanical characteristics when the proper geometry is selected. However, in practice it is difficult to manufacture the armor profile nearly as a step profile at relatively high line speeds as shown in FIG. 6B. Consequently, manufactured dielectric armor with the armored profile has a profile that is shaped in a rounded, sloped or the like fashion as generally depicted in FIG. 6A.

Finite-element analysis was conducted on the model of FIG. 6B to simulate the shape of manufactured profiles like shown in FIG. 6A. Using finite-element analysis, the inventors discovered certain dimension and/or relationships that provide desired mechanical characteristics for the armored profile. FIG. 6B depicts one-half pitch P/2 for the armored profile (i.e., the one-half pitch P/2 only depicts a fraction of the web 102 and a fraction of band 110. The one-half pitch P/2 of the armor profile has a length given by the sum of length L1 (i.e., the fractional portion of the band), length $L_T$ (i.e., a transitional portion between the band and web), and length L2 (i.e., the fractional portion of the web). Additionally, for the purpose of simplicity only the layer with the armor profile of the dielectric armor was modeled since it contributes to the majority of the mechanical characteristics for the dielectric armor. Consequently, the web has a length referred to as a groove length 2(L2) herein, which is two times the length L2.

Figure 7:
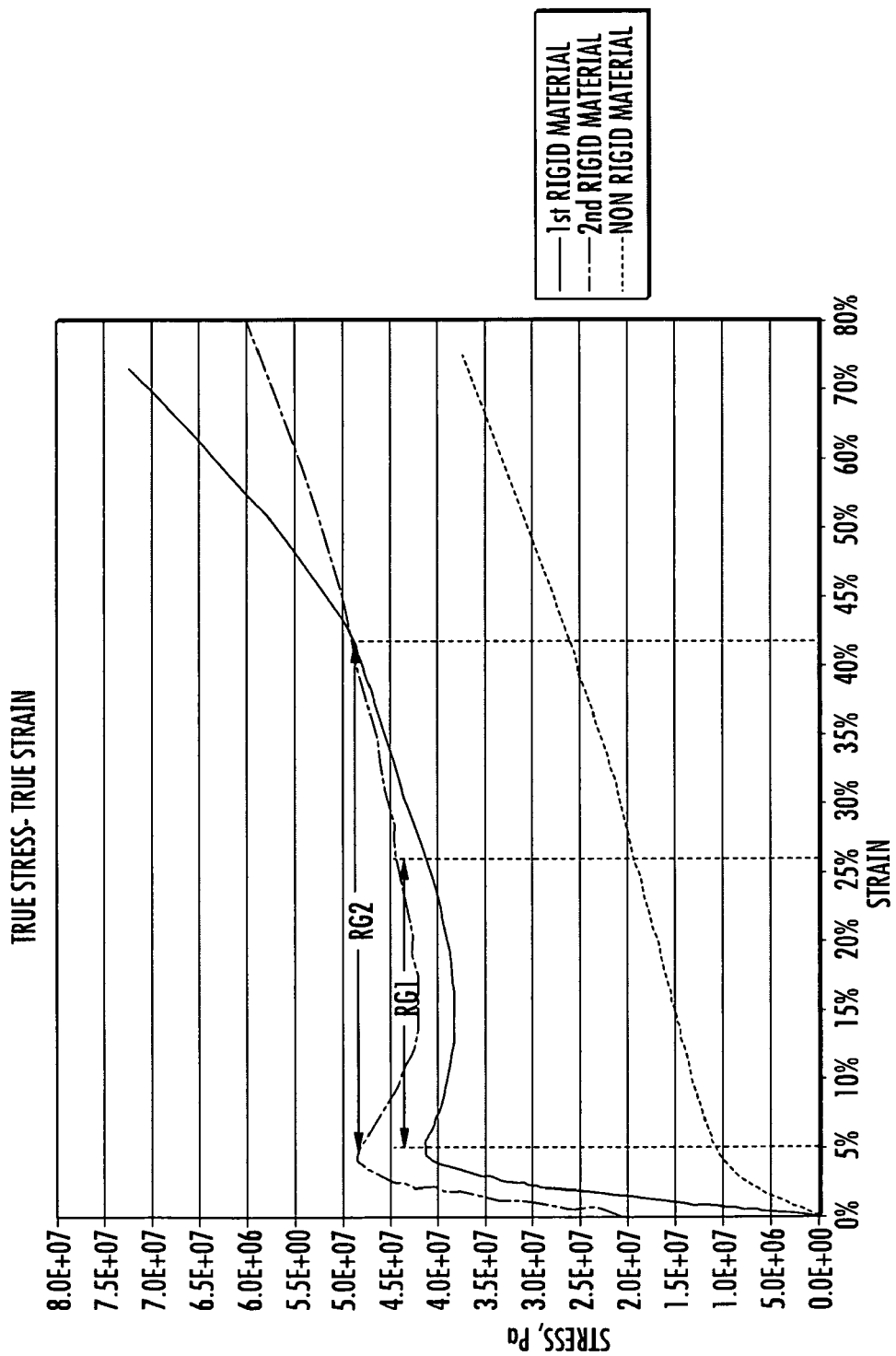
FIG. 7 is a plot of the true stress (Pa) vs. the true strain (%) for two different representative rigid materials and a representative non-rigid material that are suitable for use as a portion of the dielectric armor.

FIG. 7 is a graph having three different curves of true stress (Pa) vs. true strain (%) representing two different generic dielectric materials. Specifically, as labeled the first and second curves represent different rigid materials and the third curve represents a non-rigid material as defined herein, and may be employed in dielectric armor 120. Specifically, the first rigid material is a PVC available from Teknor Apex under the tradename SRP 2009, the second rigid material is also a PVC available from Teknor Apex under the 8015 family name, and the non-rigid material is a flame-retardant PVC available from AlphaGary under the tradename AG2052. Examples of rigid materials are rigid thermoplastics (such as rigid PVC, CPVC, glass/fiber reinforced plastics, etc.), while examples of non-rigid materials are flexible thermoplastics (such as polyolefins, PVC, PVDF, FRPE, etc.). As shown, after the knee in the curve of the rigid materials a negative slope or near zero (i.e., small) positive slope occurs in a respective region RG1 or RG2. On the other hand, the curve for the non-rigid material does not have a negative slope or a near zero slope like the rigid materials.

Dielectric materials that exhibit a region with a negative slope or a near zero positive slope in the stress-strain curve at or below the limiting design strain such as at the region RG1 of the first rigid material in FIG. 7, require special attention to inhibit bending strains from locally concentrating in the web of the armor profile. Simply stated, if the first rigid material operates in region RG1 of FIG. 7 (e.g., the 5% to 25% strain zone, which is material specific) it localizes the strain at one location of the web during bending, which may cause the web 102 to undesirably separate from band 110. Thus, region RG1 of strain with a negative slope or a near zero positive slope should be avoided. On the other hand, outside region RG1 (i.e., a strain level that significantly exceeds 25%) the strain is more evenly distributed along the web, thereby inhibiting band/web separation during bending. In other words, the failure strain for the rigid material should be beyond the region RG1 (i.e., the failure strain level for this material should exceed 25%), thereby inhibiting undesirable band/web separation for the intended application. Whereas, the failure strain level for materials without the region RG1 such as the non-rigid material depicted in FIG. 7 may allow for a wider range of failure strain levels.

Likewise, the region RG2 for the second rigid material should be avoided for the same reasons as discussed above. However, the second rigid material has a relatively low positive slope beyond region RG2 so that significantly exceeding the region RG2 means that a much higher strain level is required to inhibit band/web separation. Consequently, different rigid materials may require different minimum strain levels for inhibiting web-band separation. By way of example, a minimum strain level of about 80% is necessary for the second rigid material to inhibit web-band separation.

Moreover, it was determined that the total groove length 2(L2) should be greater for rigid materials that exhibit a region with a near zero positive slope or a negative slope in the stress-strain curve at or near the failure strain as indicated by region RG1 or RG2 to inhibit separation of the web from the band of the armor profile. Consequently, material characteristics along with band/web geometry for the material characteristics should be selected for providing the desired performance (e.g., crush, bending, optical performance, etc) for the armored fiber optic assemblies.

Additionally, the modulus of elasticity at 1% strain for the materials of FIG. 7 was determined from the true stress-true strain curves. The modulus of elasticity for the non-rigid material (AG2052) was about 320 MPa. Whereas, the modulus of elasticity for the first rigid material (SRP 2009) was about 1537 MPa and the modulus for the second rigid material (8015) was about 3088 MPa, which is about twice the value of the first rigid material.

FIG. 8A depicts Table 1 which has exemplary dimensions in millimeters for the design window of a first modeled material (i.e., the non-rigid material AG2052). Specifically, Table 1 lists exemplary dimensions for T1, T2, groove length, groove depth, and groove pitch for minimum design strains of 40% and 80% with the armor carrying 100% of the load. In other words, the loading for the modeling was performed with the dielectric armor carrying 100% of the applied 3000 Newton crush load with a deflection of 3 millimeters or less in order to provide an acceptable performance for the design window. However, the fiber optic assembly within the dielectric armor may carry some of the crush load depending on several factors such as amount of free space, type of fiber optic assembly, and the like. Simply stated, all of the modeling represented in FIGS. 8A-8F model the extreme case where the dielectric armor would carry 100% of the crush load and bending load. Consequently, some armored fiber optic cable designs may have acceptable performance, but not fall within the design window of the curves shown in FIGS. 9A-9F because the fiber optic assembly was carrying a fraction of the crush load. Simply stated, some assemblies may have the dielectric armor carrying a portion of the load along with the fiber optic assembly carrying a portion of the load, thereby providing a larger design window. Likewise, during bending the fiber optic assembly within the dielectric armor may contribute to the bending performance, but this was not considered in the finite element modeling. Illustratively, dielectric designs with relatively longer groove lengths and relatively larger total groove depths may not perform well in modeling that carries 100% of the load, but when constructed with a suitable fiber optic assembly can have acceptable performance due to the fiber optic assembly carrying a fraction of the load. Some parameters that affect load sharing between the fiber optic assembly and the dielectric armor include free space, construction of the fiber optic assembly such as jacket thickness, and the like.

The minimum design strain is the minimum percent true strain at which failure occurs (i.e., the ultimate strain), which is the case for all of the modeling. For instance, the first column of data of Table 1 lists armor profile dimensions that have strain of 80% strain or more while meeting the desired bend and crush criteria. The desired bend criteria permits a bending radius $R_B$ of 5 diameters of the fiber optic assembly (i.e., 10 radii of the fiber optic assembly) with no band/web separation and the crush criteria has an optical attenuation of 0.6 dB or less. Likewise, the next four columns of data in Table 1 represent respective sets of armor profile dimensions that result in failure with a strain of 40% or greater while meeting the same bending and crush performance. In a similar fashion, the remaining columns of Table 1 list other sets of armor profile dimensions that result in failure at the indicated strain levels. Additionally, all of the different dielectric armor modeled in Table 1 had the same inner radius $R_I$ slightly below 6 millimeters.

Figure 9A:
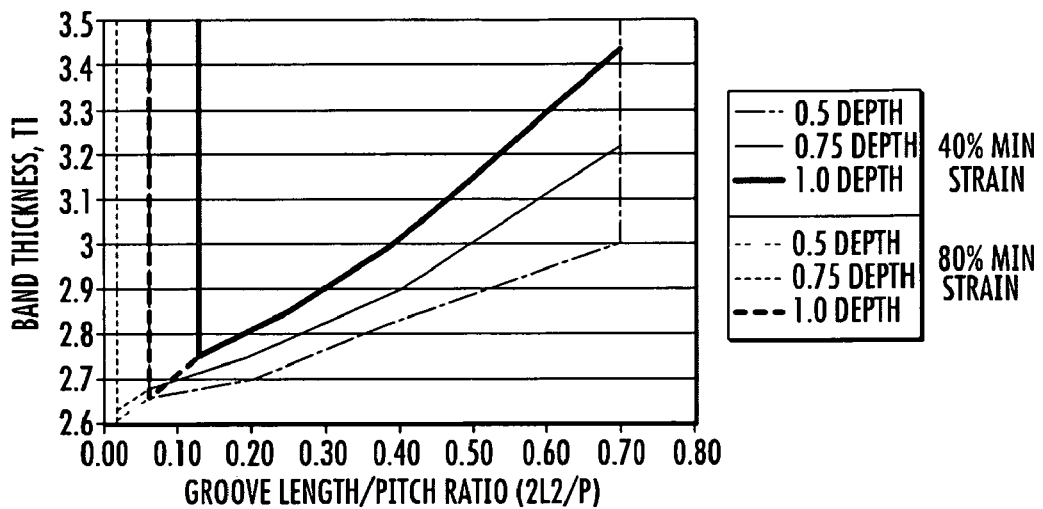
FIGS. 9A and 9B are plots of the data in FIG. 8A depicting the dielectric armor band thickness (T1) vs. the groove-length to pitch ratio (2L2/P) for the non-rigid material with the two different minimum strain levels on the same plot.
Figure 9B:
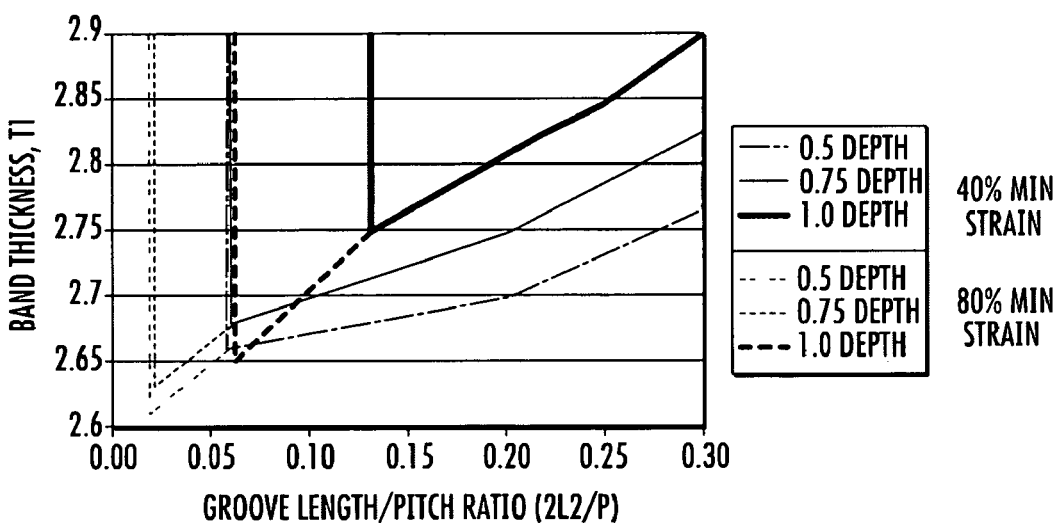

Using the data from Table 1 (FIG. 8A), families of curves for the band thickness versus a dimensional ratio for the armor profile of an exemplary non-rigid material were determined and plotted in FIGS. 9A and 9B. Specifically, FIGS. 9A and 9B illustrate six curves for the band thickness T1 vs. a ratio (i.e., (2L2)/P) of groove length 2L2 to pitch P for the two different minimum strain limits (i.e., strain of 40% or more and strain of 80% or more) and the three different total groove depths (do+di). As shown, families of curves are plotted based upon the total groove depths (do+di) of 0.5 millimeters, 0.75 millimeters, and 1.0 millimeters for the two different strain levels, which are depicted on the same graph to illustrate the changes in the design window. Alternatively, the total groove depth is calculated by T1–T2, which is equivalent to do+di as shown in FIG. 6B. Further, FIG. 9B is an enlarged view of the lower left-hand corner of the plot of FIG. 9A, thereby showing the detail of the extended design window for the curves directed to the 80% minimum design strain.

The respective areas bounded by the different curves represent respective design windows for the given total groove depth at the given strain level. For instance, the area bounded by the bold solid line curve represents the total groove depth of 1.0 millimeter at a strain of 40% or more. Designs outside the area bounded by the 1.0 millimeter/40% minimum strain curve may have issues with elevated levels of strain, and/or failure (band/web separation) during bending and the like. For instance, a design with a 3.1 millimeter band thickness and groove length/pitch ratio of 0.5 at a groove depth of 1.0 millimeter and 40% minimum strain falls outside of this bounded area and may have issues with passing crush performance. On the other hand, these dimensions have suitable crush performance when the groove depth is 0.75 millimeters and 40% minimum strain since it is bounded by that 0.75 groove depth curve as shown by FIG. 9A. Simply stated, for the given loading and design parameters for the respective curve: (a) points below the curve did not meet the desired crush performance; (b) points to the left of the curve did not meet the desired bending performance; and (c) points to the right of the curve did not meet the desired aesthetic appearance (i.e., the groove was too long relative to the pitch). By way of example, suitable aesthetic appearance has the groove length between about 20 percent and about 80 percent of the pitch.

The enlarged view shown in FIG. 9B, depicts that the design windows for the 80% minimum strain curves are larger than the counterpart design windows (i.e., the same total groove depths) for the 40% minimum strain design windows. For instance, the 80% minimum strain windows extend farther to the left as shown in the lower left corner of FIG. 9B. Thus, as shown by plotting of the modeling of Table 1 in FIGS. 9A and 9B, certain ratios and/or dimension relationships along with the material characteristics provide the armor profile with the desired performance during bending and the like.

FIGS. 8B and 8C respectively depict Tables 2 and 3 with exemplary dimensions in millimeters for the design window of a first modeled rigid material, namely, SRP 2009. Like Table 1, Table 2 lists exemplary dimensions for T1, T2, groove length, groove depth, and groove pitch for minimum strains of 40% and Table 3 lists data for minimum strains of 80%. Like before, the modeled data from Tables 2 and 3 was used for creating graphs of the modeled design window with the dielectric armor carrying 100% of the load.

Figure 9C:
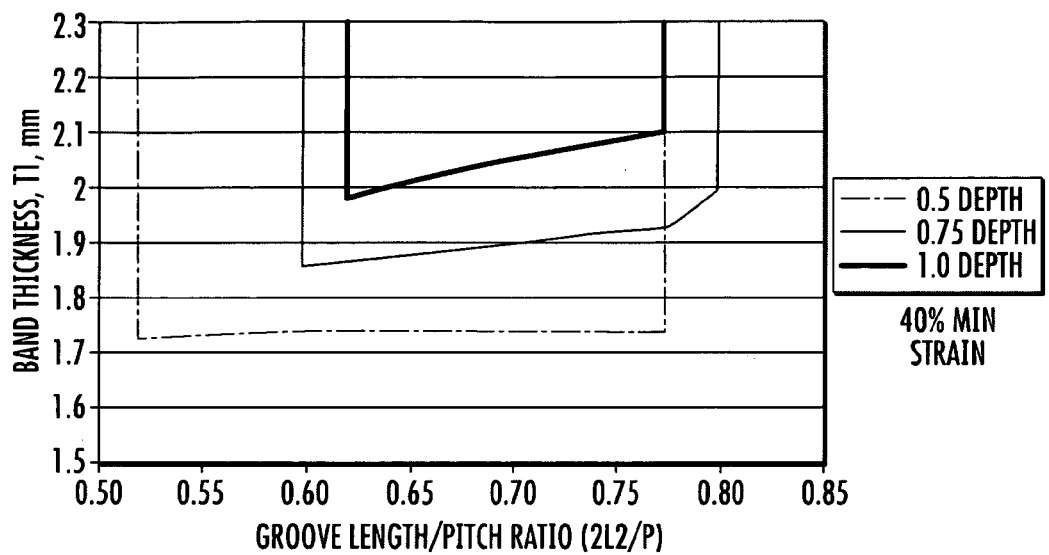
FIGS. 9C and 9D are plots of the data in FIGS. 8B and 8C depicting the dielectric armor band thickness (T1) vs. the groove-length to pitch ratio (2L2/P) for the first rigid material for two different strain levels on respective plots.
Figure 9D:
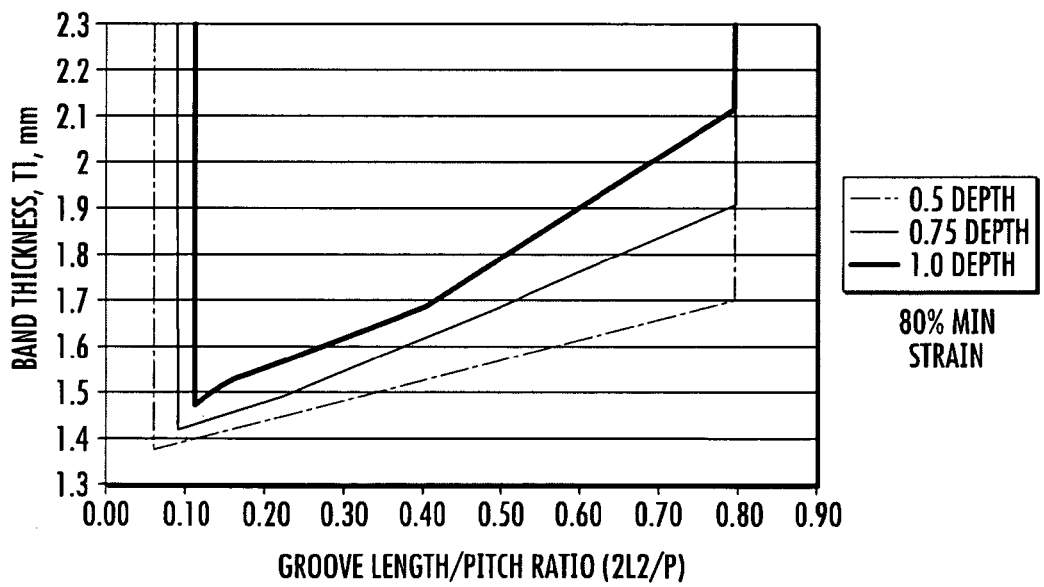

Specifically, FIGS. 9C and 9D are similar to FIG. 9A since they graphically show the curves plotting the band thickness T1 vs. a ratio (i.e., (2L2)/P) of groove length 2L2 to pitch P for the given total groove depths ($d_O+d_i$) at a given minimum strain level. Specifically, the graph of FIG. 9C illustrates the design space with a strain of 40% or more and the graph of FIG. 9D depicts the design space with a strain of 80% or more. As shown, FIGS. 9C and 9D show that the difference in the design space between the two different strain levels is more pronounced with the first rigid material (FIGS. 9C and 9D) compared with the non-rigid material (FIGS. 9A and 9B). For instance, the designs windows at 40% minimum strain are more sensitive to changes in the total groove depth ($d_O+d_i$). This pronounced difference is due to the negative slope of the stress vs. the strain curve as shown in FIG. 7 in the proximity of the 40% strain limit for the high-strength material. Consequently, greater groove-length to pitch ratios and thicknesses (T1) are required for meeting bending requirements (e.g., without band/web separation, etc.) when designing with materials that exhibit small positive slopes or negatives slopes (i.e., a trough in the stress strain curve) in the proximity of the failure strain.

Simply stated, if a material has such a trough in the stress vs. strain curve (i.e., a small positive or negative slope in the stress vs. strain curve like as shown in FIG. 7) while the failure strain is significantly greater than the strain level at the trough, then smaller groove/pitch ratios and thicknesses T1 can be employed. Strains initially concentrate in web 102 of dielectric armor 120 as it is bent. If sufficient strain hardening is not available before the failure strain is reached (i.e., if the trough region of the stress vs. strain curve is too close to the failure strain), then web 102 of thickness T2 will fail and separate.

FIGS. 8D and 8E respectively depict Tables 4 and 5 with exemplary dimensions in millimeters for the design window of a second modeled rigid material, namely, a material from the 8015 family. Tables 4 and 5 list exemplary dimensions for T1, T2, groove length, groove depth, and groove pitch for respective minimum strains of 80% and 110%. Higher minimum strains were required for the second rigid material because the region RG2 is larger and the true stress-true strain curve has a shallower slope than the first rigid material. Like above, the modeled data from Tables 4 and 5 is used for creating graphs of the modeled design window. The loading for the modeling of the second rigid material was performed with the dielectric armor carrying 100% of the applied 3000 Newton crush load with a deflection of 3 millimeters or less and 100% of the bending load in order to provide an acceptable performance for the design window.

Figure 9E:
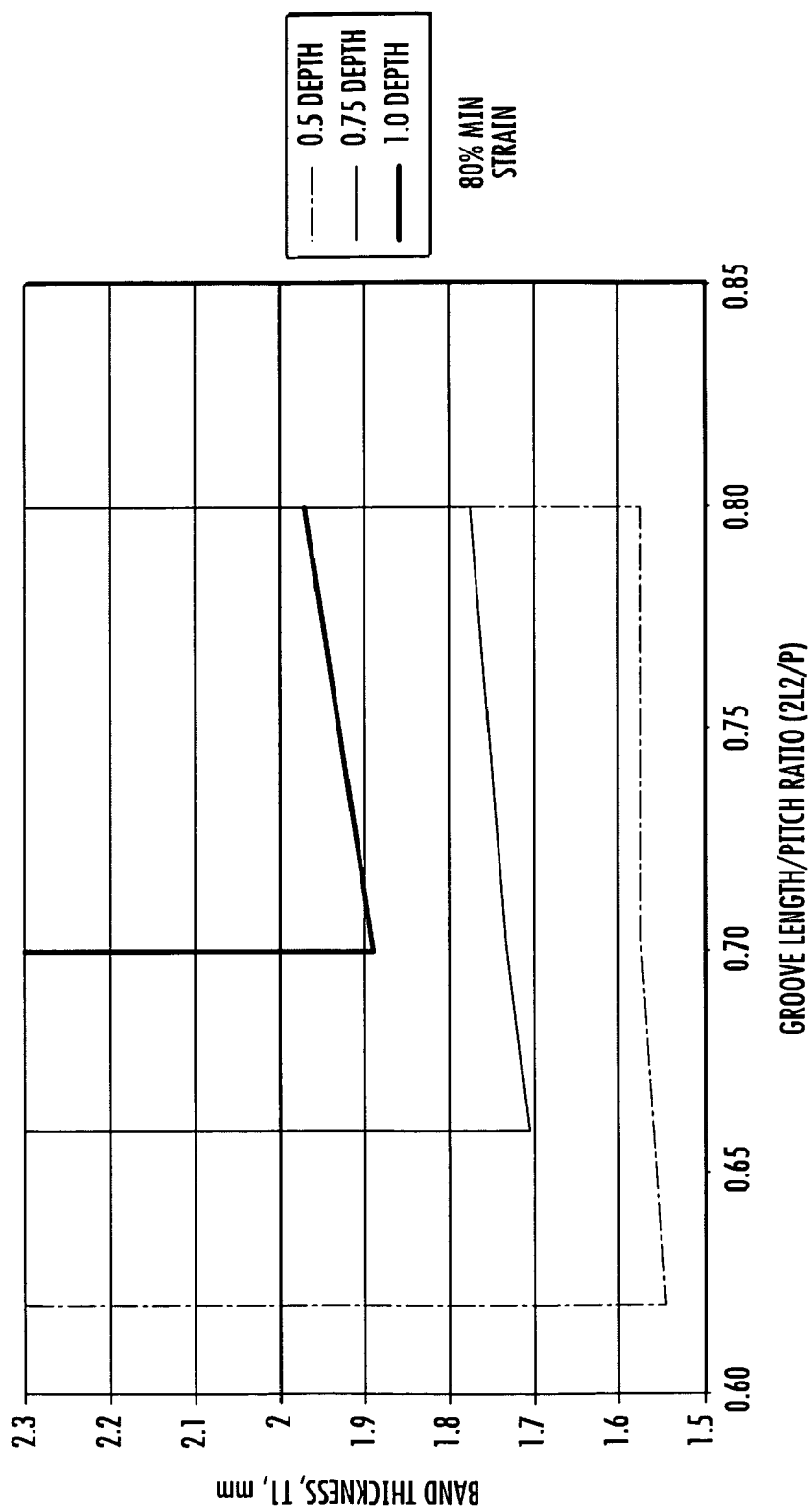
FIGS. 9E and 9F are plots of the data in FIGS. 8D and 8E depicting the dielectric armor band thickness (T1) vs. the groove-length to pitch ratio (2L2/P) for the second rigid material for two different strain levels on respective plots.
Figure 9F:
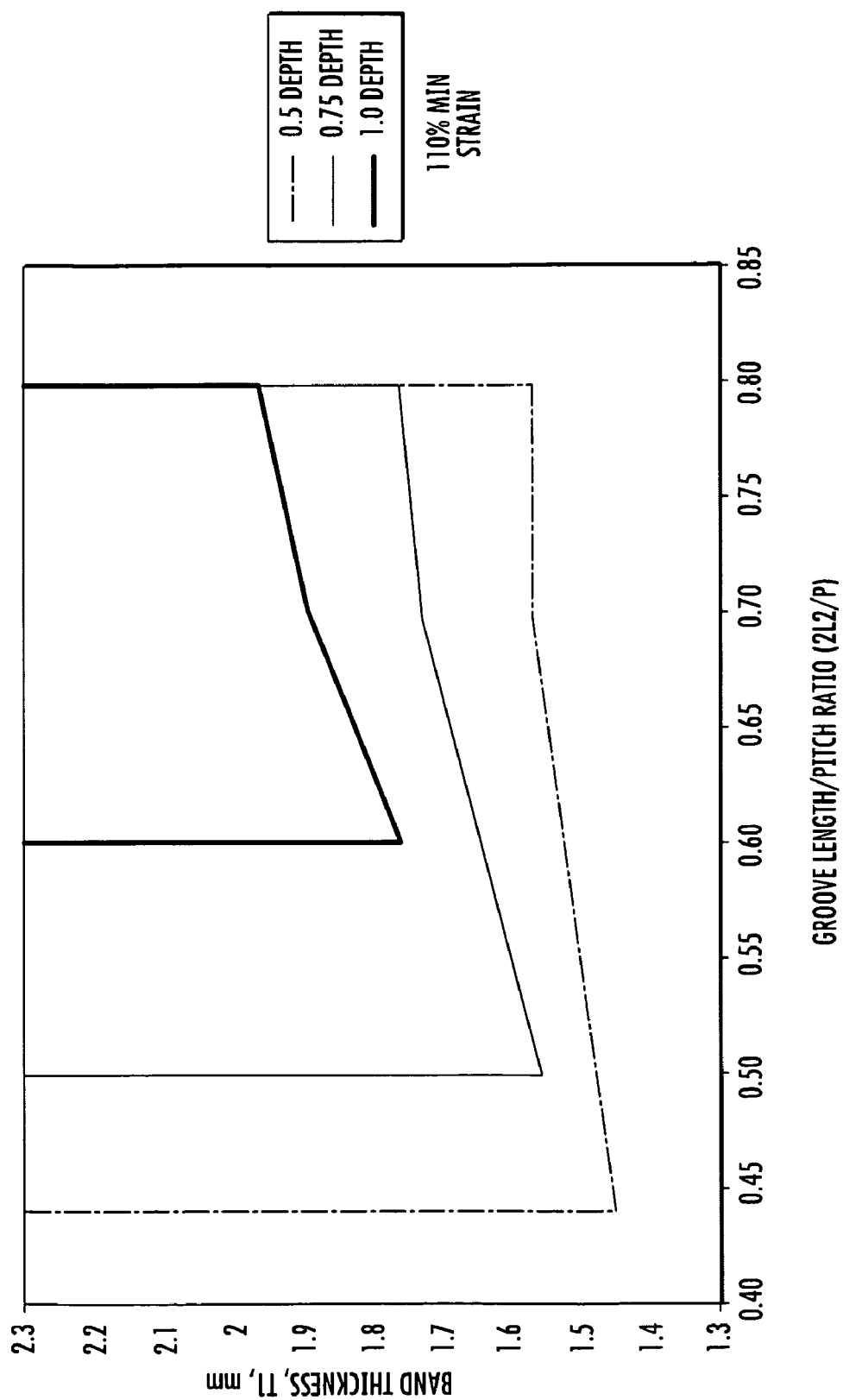

FIGS. 9E and 9F graphically show the curves plotting the band thickness T1 vs. a ratio (i.e., (2L2)/P) of groove length 2L2 to pitch P for the given total groove depths ($d_O+d_i$) at a given minimum strain level for the second rigid material. Specifically, the graph of FIG. 9E illustrates the design window with a minimum strain of 80% and the graph of FIG. 9F depicts the design window with a minimum strain of 110%.

Thus, as shown by the tables and graphs example embodiments of the armor profile can have dimensions within ranges based on the materials for providing the desired crush and bending characteristics. For instance, the dielectric armor may have inner layer formed from a first rigid material with minimum strain of 80% and an optional outer layer formed from a non-rigid material, where the band thickness T1 is between about 1 millimeters and about 5 millimeters and web thickness T2 is between about 0.1T1 and about T1 for the inner layer. The non-rigid material does not significantly contribute to the crush and bending characteristics, but can influence impact resistance and the like. By way of example, outer layer has a suitable thickness such as about 0.5 millimeters to about 2.0 millimeters such as about 1 millimeter. Additionally, suitable armored fiber optic assemblies can have designs outside of the modeled design windows using the same materials because the fiber optic assembly can carry a portion of the crush and/or bending load.

For instance, one example of an armored fiber optic assembly design similar to FIG. 2A where the fiber optic assembly contributes to carrying the load uses a 24-fiber MIC cable available from Corning Cable Systems of Hickory, N.C. as the fiber optic assembly. The 24-fiber MIC cable includes a cable jacket that supports the dielectric armor during crush and bending because the free space is relatively small such about 0.5±0.2 millimeters. The dielectric armor is formed from an inner layer of 8015 rigid material and has a band thickness of about 1.5 millimeters, a web thickness of about 1 millimeter, and a pitch of about 10 with a non-rigid outer layer formed from 910A-18 available from Teknor Apex, which is plenum-rated. This 24-fiber embodiment advantageously meets the desired mechanical characteristics such as crush and bending while also being riser-rated. Other similar embodiments can meet the mechanical characteristics and have a plenum-rating. Another suitable example where the fiber optic assembly contributes to the load carrying uses a 6-fiber MIC cable available from Corning Cable Systems. In this embodiment, the dielectric armor is again formed from an inner layer of 8015 rigid material and has a band thickness of about 1.3 millimeters, a web thickness of about 0.8 millimeter, and a pitch of about 10 with a non-rigid outer layer formed from 910A-18 and is similar to the design of FIG. 2A. This 6-fiber embodiment advantageously meets the desired mechanical characteristics such as crush and bending while also being plenum-rated.

Figure 10A:
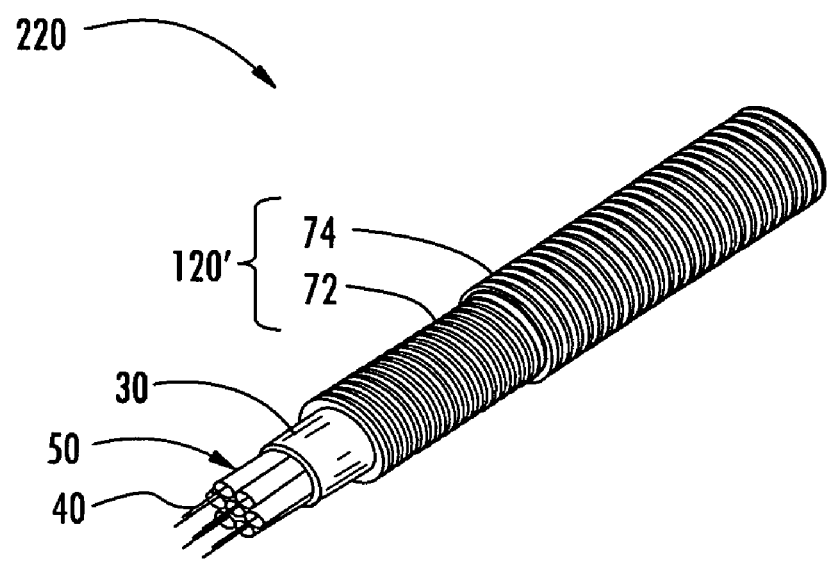
FIG. 10A is a perspective view of another embodiment of an armored fiber optic assembly having an inner and outer layer.

Other variations of armored fiber optic assemblies are also possible that may have other shapes for the dielectric armor. For instance, FIG. 10A is a perspective view of an armored fiber optic assembly 220 that includes a dielectric armor 120' having an inner layer 72 that is a rigid material and an outer layer 74 that is a non-rigid material. As with the other embodiments, dielectric armor 120' includes the armored profile and is disposed about fiber optic assembly 30 configured as a fiber optic cable. As stated above, one or both of inner layer 72 and/or outer layer 74 includes web 102 and band 110. In this embodiment, the armored profile has web 102 and band 110 that have a fixed longitudinal orientation instead of having a spiral configuration along the length of the dielectric armor. In other words, the web 102 and band 110 do not travel longitudinally along the fiber optic assembly (i.e., the lead is 0).

Figure 10B:
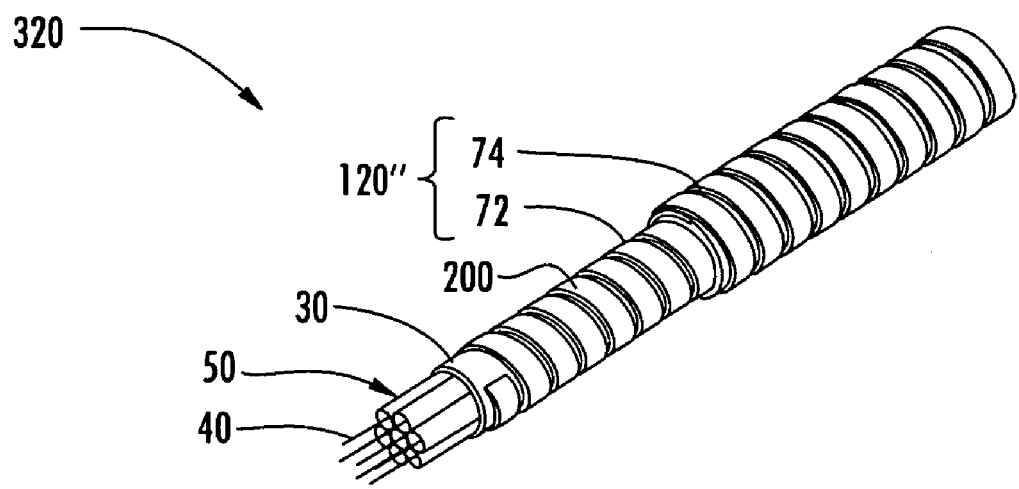
FIG. 10B is a perspective view of yet another embodiment of an armored fiber optic assembly.

FIG. 10B illustrates armored fiber optic assembly 320 having a dielectric armor 120" with an inner layer 72 formed from a strip 200 that is wound or extruded around fiber optic assembly 30 in a spiral manner. In other words, strip 200 which forms inner layer 72 does not have a continuous annular cross-section, but has a space between successive wraps of the same. As shown, strip 200 has a rectangular cross-section, but it may have rounded edges for inhibiting "zippering" of outer layer 74. In other embodiments, inner layer 72 is corrugated for providing flexibility for wrapping around the fiber optic assembly 30, or is interlocked for increased mechanical strength.

As shown, outer layer 74 conforms to inner layer 72 formed by strip 200 and generally takes on a corresponding helical shape of the armor profile. However, the shape of outer layer 74 can vary from that formed by strip 200. In an example embodiment, inner layer 120" is wound around fiber optic assembly 30 using spinning, wrapping, and/or stranding methods. The winding methods may include spinning fiber optic assembly 30. Additionally, strip 200 may be pre-heated to soften the same before being wound around or otherwise applied to fiber optic assembly 30 in order to reduce the rigidity of the inner layer. It is also possible to extrude strip 200 and then wrapping the same or creating the gap thru the wall of the inner layer. Additionally, other types of materials are possible for portions of the dielectric armor. By way of example, inner layer 72 may be an ultraviolet (UV)-light curable material (i.e., UV curable material) that is helically wrapped about fiber optic assembly 30, and then cured using a suitable dose of radiation. This process may include applying or adding a resin to strip 200.

Finite element modeling was also performed on the embodiment of FIG. 10B to determine designs that met the desired crush criteria as discussed above where the strip 200 carries about 82% of the crush loading (about 2468 Newtons of the 3000 Newtons). Bending was not considered since strip 200 has a gap G so there is no band-web separation issue like the embodiments having an inner layer with the continuous annular cross-section. Again, other embodiments can have the fiber optic assembly carry a fraction of the loading so that other variations having the desired performance are possible.

Figure 10C:
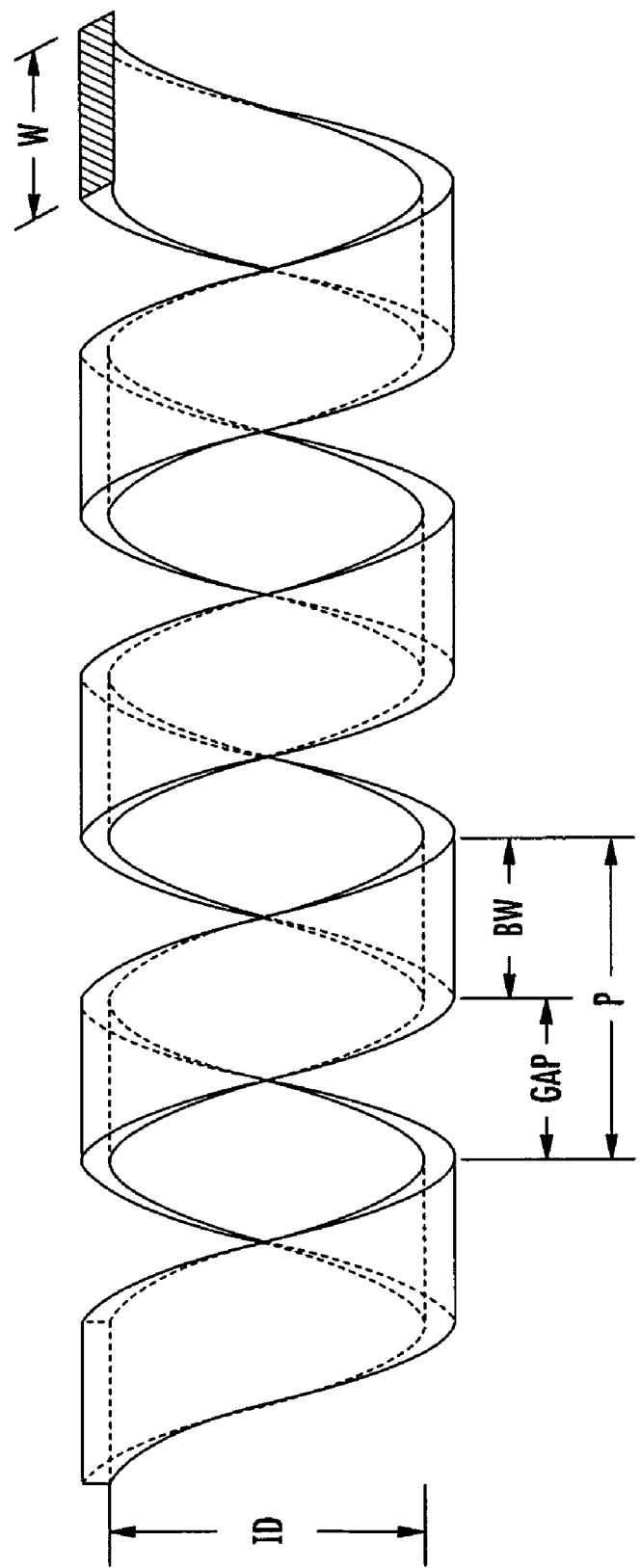
FIG. 10C is a perspective view of the inner layer of the dielectric armor of FIG. 10B still another embodiment of an armored fiber optic assembly.

Table D below lists example dimensions for the strip 200 used as inner layer 72 at different pitches about the fiber optic assembly while meeting the desired crush criteria. FIG. 10C shows the dimensions for strip 200 as listed in Table D. Specifically, Table D lists different pitches (P) for the strip 200 formed from the first rigid material (SRP 2009) with an inner diameter ID of about 6.8 millimeters, a thickness of about 2.2 millimeters (thereby yielding an outer diameter of about 11.2 millimeters), and a normal width W as listed. Additionally, Table D lists gap GAP, an actual band width BW (i.e., the deformed width of the strip), and a material ratio per length of the fiber optic assembly (i.e., the band width divided by the pitch). As depicted in Table D, a range of pitches P and normal widths W are possible for meeting the desired crush loading for the embodiment of FIG. 10B. Moreover, if fiber optic assembly carries a fraction of the loading the possible ranges for the dimensions are larger. By way of example, the embodiments of FIG. 10B can have a pitch P between about 5 millimeters and about 30 millimeters and a thickness between about 1 millimeter and about 5 millimeters. As given in Table D, the material ratio represents the percentage of material usage of the strip (i.e., the smaller the material ratio the less material is needed per meter). For instance, the design having a pitch P of 26 has the most efficient use of material to meet the desired criteria since only 47.1% of the longitudinal length of the assembly has the strip therearound.

TABLE D

Example Dimensions for the strip of FIG. 10B

| Pitch (P) mm | Width (W) Mm | Gap mm | Band Width (BW) mm | Material Ratio |
|---|---|---|---|---|
| 32 | 10.7 | 15.843 | 16.157 | 50.5% |
| 26 | 9.01 | 13.766 | 12.766 | 47.1% |
| 20 | 7.71 | 10.560 | 9.440 | 47.2% |
| 14 | 6.03 | 7.267 | 6.733 | 48.1% |

Figure 10D:
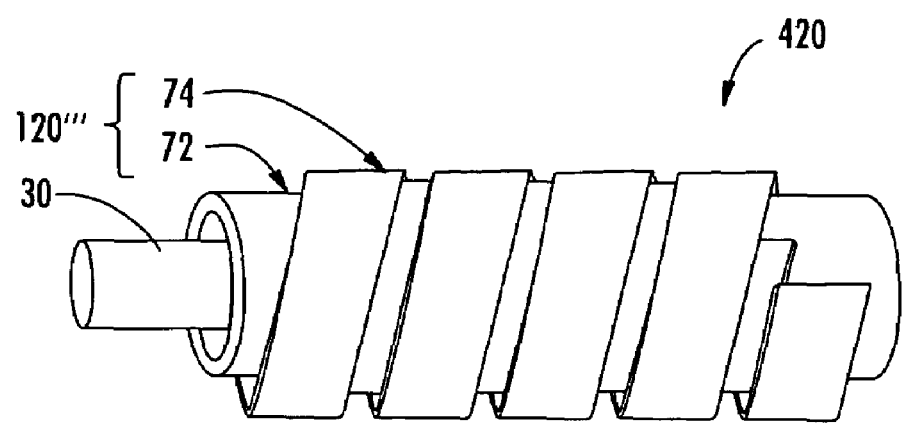
FIG. 10D is a perspective view of still another embodiment of an armored fiber optic assembly.

Other embodiments may look similar to FIG. 10B using the strip, but have a different construction. For instance, FIG. 10D depicts armored fiber optic assembly 420 having a dielectric armor 120''' that looks similar to FIG. 10B, but the inner layer 72 is extruded about fiber optic assembly 30, and outer layer 74 is then extruded around the inner layer 72. In this embodiment, both the inner layer 72 and the outer layer 74 have a continuous annular cross-section. Specifically, inner layer 72 has a uniform cross-section (i.e., a smooth tube) and the armor profile is disposed in the outer layer 74. More specifically, outer layer 74 has a very thin web thickness such as about 0.5 millimeters or less, but other values are possible. Embodiments having a smooth tube for inner layer 72 may have a relatively low minimum strain level such as a minimum strain of about 10% or more. For instance, one smooth tube inner layer has as a minimum strain of about 12% at a bend radius $R_B$ of about $8R_T$ (i.e., 4 diameter of the armored fiber optic assembly).

Figure 11:
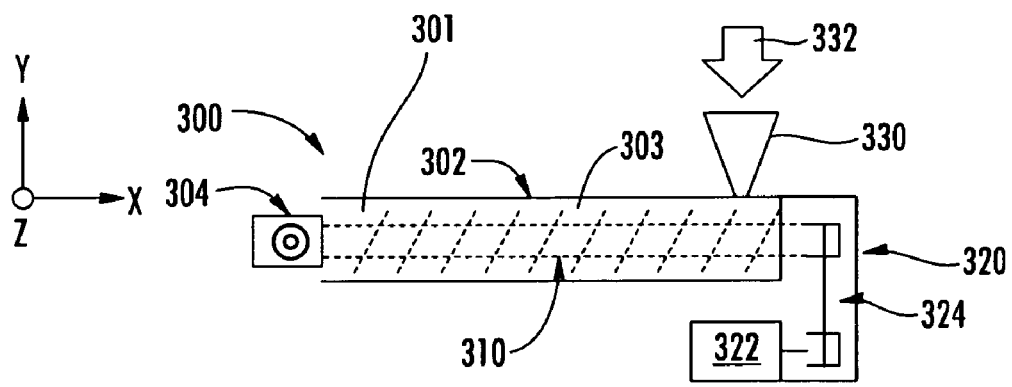
FIG. 11 is a schematic diagram of an explanatory extrusion system for making dielectric armor.

One method of forming the dielectric armor includes using one or more extrusion-based methods for forming the armor profile. For instance, FIG. 11 depicts a schematic side view of an extrusion system 300 that includes an extruder 302 that defines an interior 301, having a barrel 303 and a screw 310 therein that is attached to a crosshead assembly ("crosshead") 304. X-Y-Z Cartesian coordinates are shown for the sake of reference, and the view in FIG. 11 is in the X-Y plane. Extruder 302 includes screw 310 that is mechanically connected to and driven by a motor assembly 320. Motor assembly 320 includes a motor 322 and a drive system 324 that connects the motor to screw 310. A material hopper 330 provides extrusion material 332—here, the dielectric material that ultimately makes up dielectric armor 120—to extruder 302. An explanatory extrusion system that is suitable for being adapted for use as extrusion system 300 is disclosed in U.S. Pat. No. 4,181,647.

Figure 12:
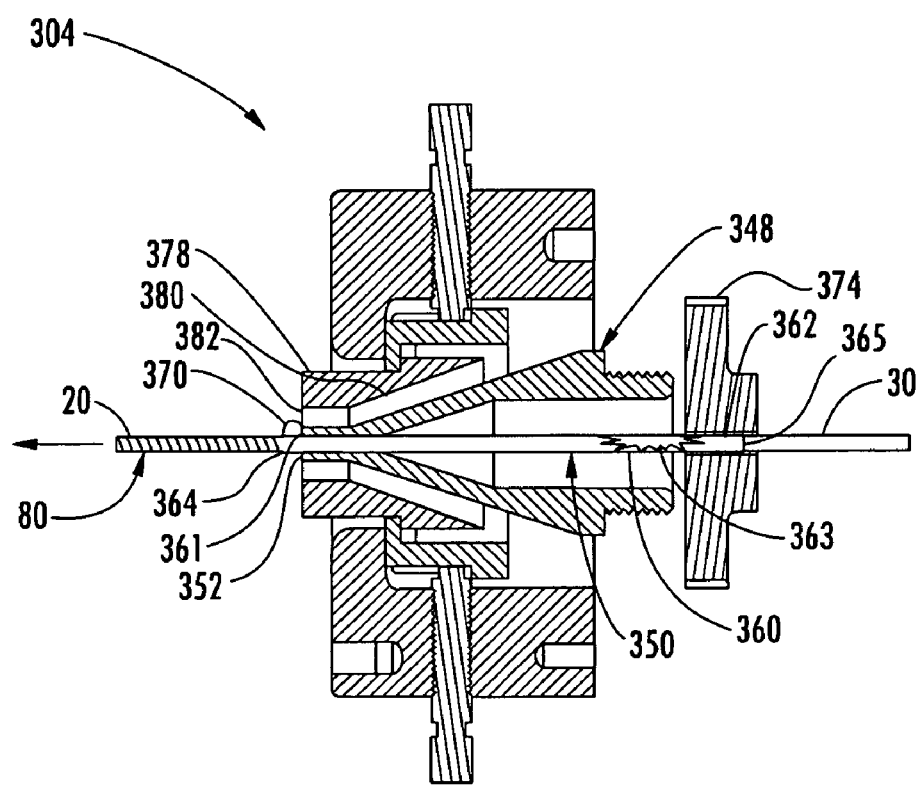
FIG. 12 is a schematic cross-sectional view of the crosshead of the extrusion system of FIG. 11.

FIG. 12 is a close-up, partial cross-sectional schematic view of an explanatory crosshead 304 as viewed in the Y-Z plane. Crosshead 304 includes a tip 348 that defines a central channel 350 having an output end 352 and in which is arranged a profile tube 360 having an outer surface 361, an inner surface 362 that defines a tube interior 363, a proximal (output) end 364, and a distal end 365. A profiling feature 370 is located on outer surface 361 at output end 352. In an example embodiment, profiling feature 370 is a nub or a bump. Profile tube interior 363 is sized to accommodate fiber optic assembly 30 axially. Profile tube distal end 365 is centrally engaged by a gear 374 that, in turn, is driven by a motor (not shown) in a manner such that profile tube 360 rotates within channel 350.

Crosshead 304 further includes a die 378 arranged relative to tip 348 to form a cone-like material channel 380 that generally surrounds central channel 350 and that has an output end 382 in the same plane as channel output end 352. Material channel 380 is connected to extruder interior 301 so as to receive extrusion material 332 therefrom and through which flows the extrusion material during the extrusion process to form one or more layers of the dielectric armor. In the example embodiment of crosshead 304 of FIG. 12, profile tube output end 365 extends beyond channel output end 352 such that profiling feature 370 thereon resides adjacent material channel output end 382. In an example embodiment, profile tube 360 and tip 348 are integrated to form a unitary tool.

In forming armored fiber optic assemblies 20, extrusion material (not shown) flows through material channel 380 and out of material channel output end 382. At the same time, fiber optic assembly 30 is fed through profile tube interior 363 and out of profile tube output end 364 (and thus through tip 348 and die 378). In the meantime, profile tube 360 is rotated via gear 374 so that profiling feature 370 redirects (i.e., shapes) the flow of the extrusion material as it flows about fiber optic assembly 30. As fiber optic assembly 30 moves through profile tube output end 364, the circular motion of profiling feature 370 diverts the flow of extrusion material. When motion of the profiling feature 370 is combined with the linear motion of fiber optic assembly 30 the flow of the extrusion material forms an armored profile. The speed at which profile tube 360 rotates relative to the motion of fiber optic assembly 30 (which may also be rotating) dictates the pitch of the same. For instance, all things being equal higher rotational speeds for the profiling feature 370 results in a shorter pitch. The size and shape characteristics of profiling feature 370 dictate, at least in part, the particular armor profile imparted to an outer surface 80 of the dielectric armor. Though the extrusion flow is primarily diverted on the interior of the armor, the draw-down of the material moves the groove partially or completely to the outer surface of the armor. Of course, this type of extrusion set-up may be used on any desired layer of the dielectric armor.

Figure 13:
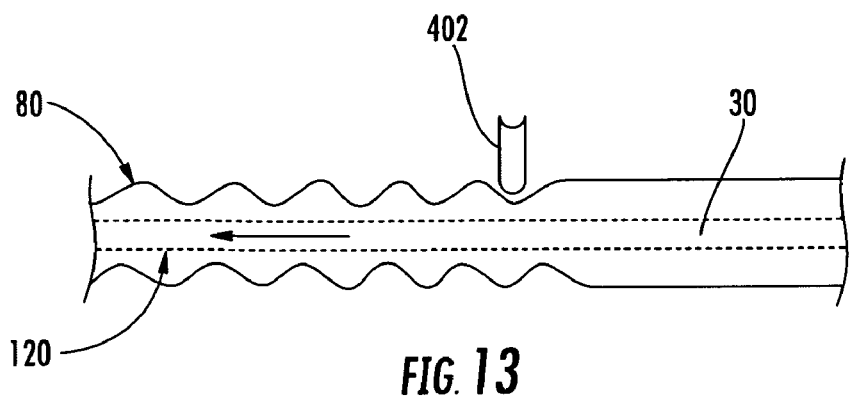
FIG. 13 is a schematic side view illustrating another method of forming the dielectric armor.

Additionally, there are other suitable methods for forming the armor profile. By way of example, FIG. 13 schematically illustrates the dielectric armor 120 initially being extruded as a smooth-surfaced tube (i.e., having a smooth outer surface as shown on the right-side). Thereafter, the armor profile of the outer surface 80 is then formed in the smooth-surfaced tube, prior to hardening, by the application (e.g., pressing) of a deforming member 402 (e.g., a nub or a finger) into the layer so as to shape outer surface 80 in a manner similar to that used in a lathe. In this example, the deforming member 402 may simply divert material from the web to the band, or it may remove material entirely from the dielectric armor 120. In one example embodiment, deforming member 402 is stationary and cable 20 is rotated, while in another example embodiment, deforming member 402 rotates around the dielectric armor 120 as it passes. In still another example embodiment, both the dielectric armor 120 and deforming member 402 rotate. Deforming member 402 may also be integrated into the extrusion tooling (die).

Figure 14:
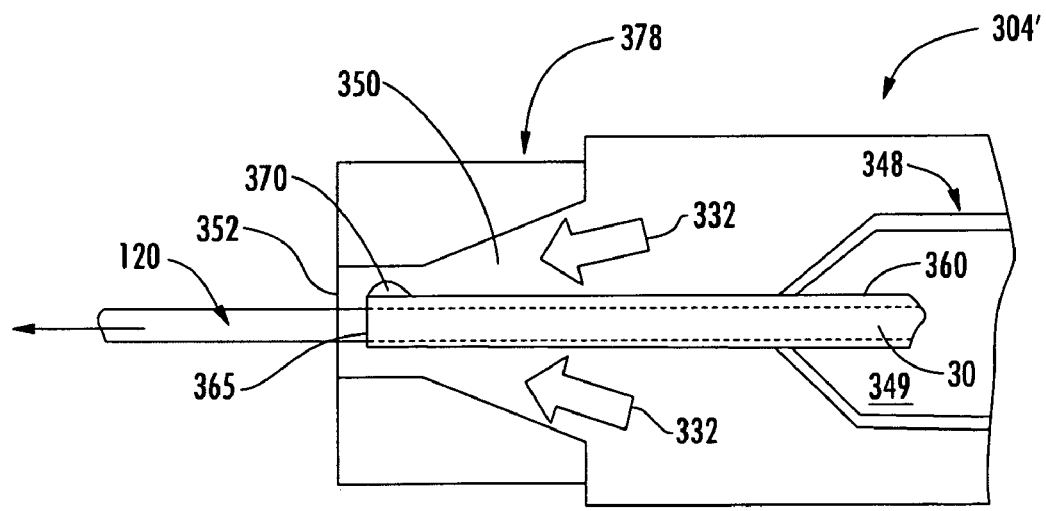
FIG. 14 is a partial, cross-sectional view of another explanatory example of a crosshead wherein the profiling feature is within the crosshead die.

FIG. 14 is a close-up, schematic cross-sectional view of another explanatory embodiment of crosshead 304' similar to that shown in FIG. 12, wherein tip 348 and die 378 are configured so that central channel 350 is combined with the material channel that flows extrusion material 332 therethru. A portion of profile tube 360 resides in an interior region 349 of tip 348, while the proximal end portion of the profile tube resides within channel 350 so that profiling feature 370 resides within central channel 350 adjacent to channel output end 352. This geometry allows for controlling the flow of extrusion material 332 while confining the material within die 378.

Figure 15:
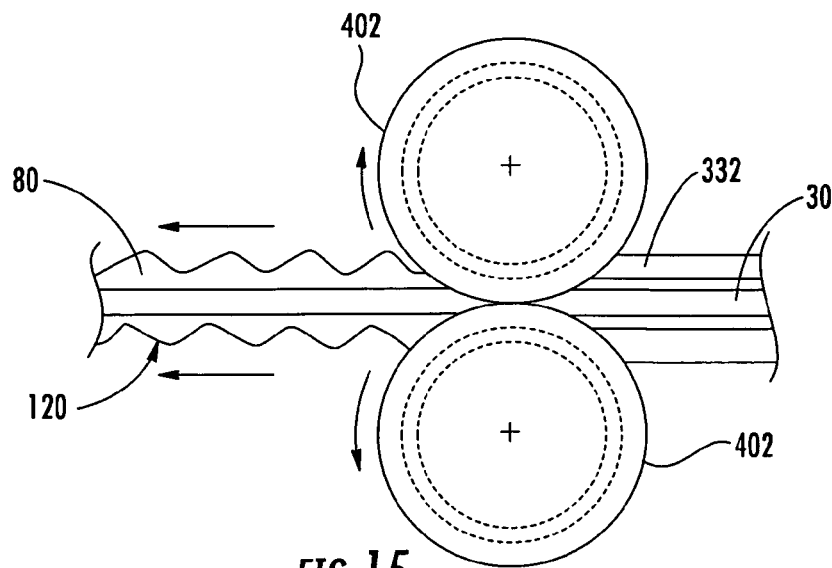
FIG. 15 is a side view of an example extrusion system wherein the profiling feature is located external to the crosshead and impresses the profile into the dielectric armor.
Figure 16:
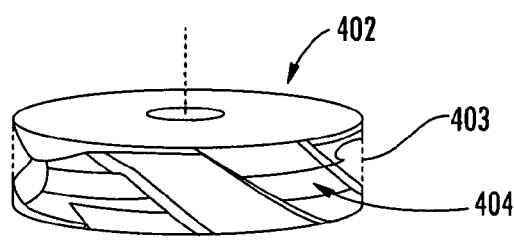
FIG. 16 is a perspective view of an example roller-type deforming member that is used to impress the armor profile into the dielectric armor.

In another explanatory embodiment similar to that shown in FIG. 13 and as illustrated in FIGS. 15 and 16, the dielectric armor is initially extruded as a smooth-surfaced tube (i.e., having a smooth outer surface on the right-side) using dielectric material 332. The armor profile of outer surface 80 is then formed prior to hardening, by the application (e.g., pressing) of deforming member 402 (e.g., a set of gears) having one or more features 404 that press into the dielectric armor in order to shape outer surface 80. FIG. 16 shows a perspective view of an exemplary embodiment of a roller-type deforming member 402 having an outer edge 403 in which features 404 are formed. In this embodiment, deforming member 402 of FIG. 15 may be formed in sets of two, three, four, or more for forming the desired armor profile. Roller-type deforming member 404 rolls over the outer surface 80 of the dielectric armor before it hardens, thereby impressing features 404 and forming the armor profile.

Figure 17:
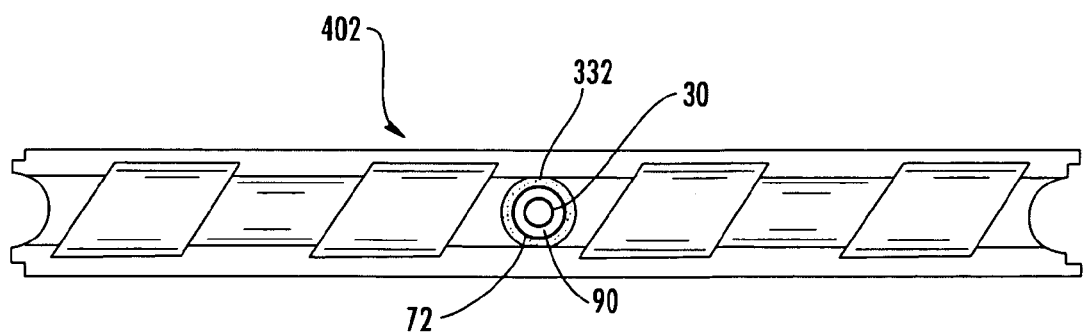
FIG. 17 is a front view illustrating the use of two roller-type deforming members to impress the armor profile into the dielectric armor.

Additionally, deforming member 402 may press extrusion material 332 against fiber optic assembly 30 to eliminate free space 90. Deforming member 402 may also press against dielectric armor 120 in a manner that maintains the desired amount of free space 90. FIG. 17 is a front view that illustrates the use of two roller-type deforming member to impress the desired armor profile into the dielectric armor. Of course, the roller-type deforming member can have any desired pattern for creating the desired armored profile.

It will be apparent to those skilled in the art that various modifications and variations can be made to the present invention without departing from the spirit and scope of the invention. Thus, it is intended that the present invention cover the modifications and variations of this invention, provided they come within the scope of the appended claims and their equivalents.

We claim:

1. An armored fiber optic assembly that is elongate and, thereby, has a length, the armored fiber optic assembly comprising:
   a fiber optic assembly having at least one optical fiber; and
   a dielectric armor surrounding the fiber optic assembly, the dielectric armor having an armor profile, wherein the dielectric armor has at least one layer formed from a rigid material, the armor profile is undulating along the length of the armored fiber optic assembly, and the armor profile has a band thickness and a web thickness, wherein
      the band thickness is between about 0.5 millimeters and about five millimeters,
      the web thickness is less than the band thickness, and
      the web thickness is greater than or equal to 0.1 times the band thickness.

2. The armored fiber optic assembly of claim 1, wherein the at least one layer has a continuous annular cross-section.

3. The armored fiber optic assembly of claim 1, wherein the armored fiber optic assembly has a diametral deflection of 3.3 millimeters or less during a crush resistance test, the crush resistance test applies a load of 300 Newtons/centimeter over a 10 centimeter length of the armored fiber optic assembly for a period of ten minutes.

4. The armored fiber optic assembly of claim 1, wherein the optical fiber has a delta attenuation of 0.2 dB or less during a crush resistance test.

5. The armored fiber optic assembly of claim 1, the armor profile has a pitch P between about 5 millimeters and about 30 millimeters.

6. The armored fiber optic assembly of claim 1, the armor profile having a groove length that is between about 20 percent and 80 percent of a pitch P.

7. The armored fiber optic assembly of claim 1, wherein the armored fiber optic assembly has a free space of about 2 millimeters or less between an outer surface of the fiber optic assembly and an inner surface of the dielectric armor.

8. The armored fiber optic assembly of claim 1, wherein the at least one layer has a modulus of elasticity of about 1200 MPa or greater.

9. The armored fiber optic assembly of claim 1, wherein the armored fiber optic cable has a delta attenuation of 0.2 dB or less during an impact test using a 2-kilogram mass.

10. The armored fiber optic assembly of claim 1, the armored fiber optic assembly being flame-retardant.

11. The armored fiber optic assembly of claim 1, wherein the dielectric armor has a minimum strain of about 12% or more at a bend radius of four diameters of the armored fiber optic assembly.

12. The armored fiber optic assembly of claim 1, wherein the at least one layer of the dielectric armor is an extruded polymeric tube that is undulating along the length of the armored fiber optic assembly and, thereby, defines both the band thickness and the web thickness of the armor profile.

13. The armored fiber optic assembly of claim 1, wherein:
   the at least one layer of the dielectric armor is a polymeric inner layer that extends along the length of the armored fiber optic assembly;
   the dielectric armor further comprises a polymeric outer layer that extends around the inner layer and extends along the length of the armored fiber optic assembly; and
   the inner and outer layers are cooperative so that the armor profile is undulating along the length of the armored fiber optic assembly.

14. The armored fiber optic assembly of claim 13, wherein the armor profile comprises an exterior groove that spirals around the fiber optic assembly and, thereby, extends along the length of the armored fiber optic assembly.

15. The armored fiber optic assembly of claim 1, wherein the armor profile comprises an exterior groove that spirals around the fiber optic assembly and, thereby, extends along the length of the armored fiber optic assembly.

16. The armored fiber optic assembly of claim 15, wherein the armor profile further comprises an inner groove that spirals around the fiber optic assembly and, thereby, extends along the length of the armored fiber optic assembly.

17. The armored fiber optic assembly of claim 1, wherein:
   the at least one layer of the dielectric armor is an inner layer that extends along the length of the armored fiber optic assembly;
   the inner layer defines both the band thickness and the web thickness of the armor profile;
   the dielectric armor further comprises an outer layer that extends around the inner layer and extends along the length of the armored fiber optic assembly;
   the outer layer has a substantially uniform thickness along the length of the armored fiber optic assembly; and
   the outer layer is less rigid than the inner layer.

18. The armored fiber optic assembly of claim 17, wherein the inner layer defines outer and inner grooves that spiral around the fiber optic assembly and, thereby, extend along the length of the armored fiber optic assembly.

19. An armored fiber optic assembly that is elongate and, thereby, has a length, the armored fiber optic assembly comprising:
   a fiber optic assembly having at least one optical fiber; and
   a dielectric armor surrounding the fiber optic assembly, the dielectric armor having an armor profile, wherein the dielectric armor has an inner layer formed from a rigid material and an outer layer formed from a non-rigid material that is less hard than the rigid material, the armor profile is undulating along the length of the armored fiber optic assembly, and the armor profile has a band thickness and a web thickness, wherein the band thickness is between about 0.5 millimeters and about five millimeters, the web thickness is less than the band thickness, and the web thickness is greater than or equal to 0.1 times the band thickness.

20. The armored fiber optic assembly of claim 19, wherein the inner layer has a continuous annular cross-section.

21. The armored fiber optic assembly of claim 19, wherein the armored fiber optic assembly has a diametral deflection of 3.3 millimeters or less during a crush resistance test, the crush resistance test applies a load of 300 Newtons/centimeter over a 10 centimeter length of the armored fiber optic assembly for a period of ten minutes.

22. The armored fiber optic assembly of claim 19, the armor profile has a pitch P between about 5 millimeters and about 30 millimeters.

23. The armored fiber optic assembly of claim 19, the armor profile having a groove length that is between about 20 percent and 80 percent of a pitch P.

24. The armored fiber optic assembly of claim 19, wherein the armored fiber optic assembly has a free space of about 2 millimeters or less between an outer surface of the fiber optic assembly and an inner surface of the dielectric armor.

25. The armored fiber optic assembly of claim 19, wherein the armor profile is essentially formed by at least one of the inner layer or the outer layer.

26. The armored fiber optic assembly of claim 19, wherein the inner layer has a modulus of elasticity of about 1200 MPa or greater.

27. The armored fiber optic assembly of claim 19, wherein the armored fiber optic cable has a delta attenuation of 0.2 dB or less during an impact test using a 2-kilogram mass.

28. The armored fiber optic assembly of claim 19, wherein the optical fiber has a delta attenuation of 0.2 dB or less during the crush resistance test.

29. The armored fiber optic assembly of claim 19, the armored fiber optic assembly being flame-retardant.

30. The armored fiber optic assembly of claim 19, the inner layer being a polyvinyl chloride (PVC) and the outer layer being a PVC.

31. The armored fiber optic assembly of claim 19, wherein:

the inner layer is polymeric and defines both the band thickness and the web thickness of the armor profile;

the outer layer is polymeric and has a substantially uniform thickness along the length of the armored fiber optic assembly;

the band thickness and the web thickness of the inner layer are cooperative with the outer layer to define an exterior groove that spirals around the fiber optic assembly and, thereby, extends along the length of the armored fiber optic assembly; and the inner layer alone defines an inner groove that spirals around the fiber optic assembly and, thereby, extends along the length of the armored fiber optic assembly.

* * * * *